(12) United States Patent
Won et al.

(10) Patent No.: US 10,075,579 B2
(45) Date of Patent: Sep. 11, 2018

(54) MOBILE TERMINAL, USER INTERFACE METHOD IN THE MOBILE TERMINAL, AND COVER OF THE MOBILE TERMINAL

(71) Applicant: Samsung Electronics Co., Ltd., Gyeonggi-do (KR)

(72) Inventors: Sung-Joon Won, Gyeonggi-do (KR); Young-Hak Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/603,760

(22) Filed: Jan. 23, 2015

(65) Prior Publication Data

US 2015/0229754 A1 Aug. 13, 2015

(30) Foreign Application Priority Data

Feb. 11, 2014 (KR) ........................ 10-2014-0015272

(51) Int. Cl.
*H04M 1/00* (2006.01)
*H04M 1/725* (2006.01)
(Continued)

(52) U.S. Cl.
CPC ........ *H04M 1/72563* (2013.01); *G06F 1/165* (2013.01); *G06F 1/169* (2013.01); *G06F 1/1626* (2013.01); *G06F 1/1632* (2013.01); *G06F 1/1677* (2013.01); *G06F 1/1684* (2013.01); *G06F 3/01* (2013.01); *G06F 3/017* (2013.01); *G06F 3/02* (2013.01); *G06F 3/0202* (2013.01); *G06F 3/0482* (2013.01); *G06F 3/04817* (2013.01); *G06F 3/04883* (2013.01); *G06F 3/04886* (2013.01); *H04B 1/3888* (2013.01);
(Continued)

(58) Field of Classification Search
CPC ............ H04M 1/72563; H04M 1/0266; H04B 1/3888
USPC ............................................ 455/575.1, 575.8
See application file for complete search history.

(56) References Cited

U.S. PATENT DOCUMENTS 9,307,129 B2 * 4/2016 Oh ........................ H04N 5/2254
2004/0248621 A1 * 12/2004 Schon ................... G06F 1/1616
455/566
(Continued)

FOREIGN PATENT DOCUMENTS

JP 2006-277739 10/2006
KR 1020080108839 12/2008
(Continued)

OTHER PUBLICATIONS

European Search Report dated Jun. 18, 2015 issued in counterpart application No. 15154725.4-1507, 5 pages.
(Continued)

*Primary Examiner* — Md Talukder
(74) *Attorney, Agent, or Firm* — The Farrell Law Firm, P.C.

(57) ABSTRACT

A mobile terminal, a method in the mobile terminal, and a cover of the mobile terminal are provided for processing input. A first area of a touch screen of the mobile terminal corresponding to a window area of the cover is defined, and a second area of the touch screen of the mobile terminal corresponding to a non-window area of the cover is defined. A first input in the second area while the cover is closed over the touch screen is detected and the first input as a first control command is processed.

31 Claims, 39 Drawing Sheets

(51) Int. Cl.
  *G06F 3/01* (2006.01)
  *G06F 3/02* (2006.01)
  *H04B 1/3888* (2015.01)
  *G06F 1/16* (2006.01)
  *G06F 3/0482* (2013.01)
  *G06F 3/0488* (2013.01)
  *G06F 3/0481* (2013.01)
  *H04M 1/02* (2006.01)

(52) U.S. Cl.
  CPC . *H04M 1/72575* (2013.01); *G06F 2200/1633* (2013.01); *G06F 2200/1634* (2013.01); *G06F 2203/04803* (2013.01); *G06F 2203/04809* (2013.01); *H04M 1/0245* (2013.01)

(56) References Cited

U.S. PATENT DOCUMENTS

| | | | | |
|---|---|---|---|---|
| 2008/0062348 A1* | 3/2008 | Sasuga | G02F 1/133308 | 349/58 |
| 2010/0238119 A1* | 9/2010 | Dubrovsky | G06F 1/1626 | 345/169 |
| 2011/0065474 A1 | 3/2011 | Won et al. | | |
| 2011/0260980 A1 | 10/2011 | Palacios | | |
| 2012/0250241 A1* | 10/2012 | Minemura | G06F 1/1616 | 361/679.21 |
| 2013/0083465 A1* | 4/2013 | Motoishi | G06F 1/1613 | 361/679.21 |
| 2013/0109435 A1* | 5/2013 | McCaughey | H01Q 1/243 | 455/556.1 |
| 2013/0181935 A1* | 7/2013 | McKenzie | G06F 3/044 | 345/174 |
| 2013/0300679 A1* | 11/2013 | Oh | A45C 11/00 | 345/173 |
| 2014/0073377 A1* | 3/2014 | Chang | H04B 1/3888 | 455/575.8 |
| 2014/0128131 A1* | 5/2014 | Sin | H04M 1/185 | 455/575.8 |
| 2014/0185206 A1* | 7/2014 | Kim | H05K 5/0017 | 361/679.01 |
| 2014/0198070 A1* | 7/2014 | Won | G06F 3/017 | 345/173 |
| 2014/0204511 A1* | 7/2014 | Oh | G06F 1/1632 | 361/679.01 |
| 2014/0274214 A1* | 9/2014 | Kim | H04M 1/0266 | 455/566 |
| 2014/0292589 A1* | 10/2014 | Park | H01Q 1/243 | 343/702 |
| 2014/0357330 A1* | 12/2014 | Lin | H04M 1/0283 | 455/575.8 |
| 2015/0105128 A1* | 4/2015 | Huang | H04B 1/3888 | 455/575.8 |
| 2015/0138021 A1* | 5/2015 | Konu | H01Q 1/48 | 343/702 |
| 2015/0155903 A1* | 6/2015 | Jang | H04B 1/3888 | 455/575.8 |
| 2015/0229754 A1* | 8/2015 | Won | G06F 1/165 | 455/575.8 |
| 2015/0280770 A1* | 10/2015 | Rhee | H04B 1/3888 | 455/575.8 |
| 2016/0154512 A1* | 6/2016 | Won | G06F 3/017 | 345/581 |
| 2016/0277053 A1* | 9/2016 | Wong Chee | H04B 1/3888 | |

FOREIGN PATENT DOCUMENTS

| | | |
|---|---|---|
| KR | 1020110025939 | 3/2011 |
| KR | 2020120005719 | 8/2012 |
| KR | 200464076 | 12/2012 |
| KR | 1020130004769 | 1/2013 |
| KR | 101285669 B1 * | 7/2013 |
| WO | WO 01/28190 | 4/2001 |

OTHER PUBLICATIONS

International Search Report dated Apr. 20, 2015 issued in counterpart application No. PCT/KR2015/001283.

* cited by examiner

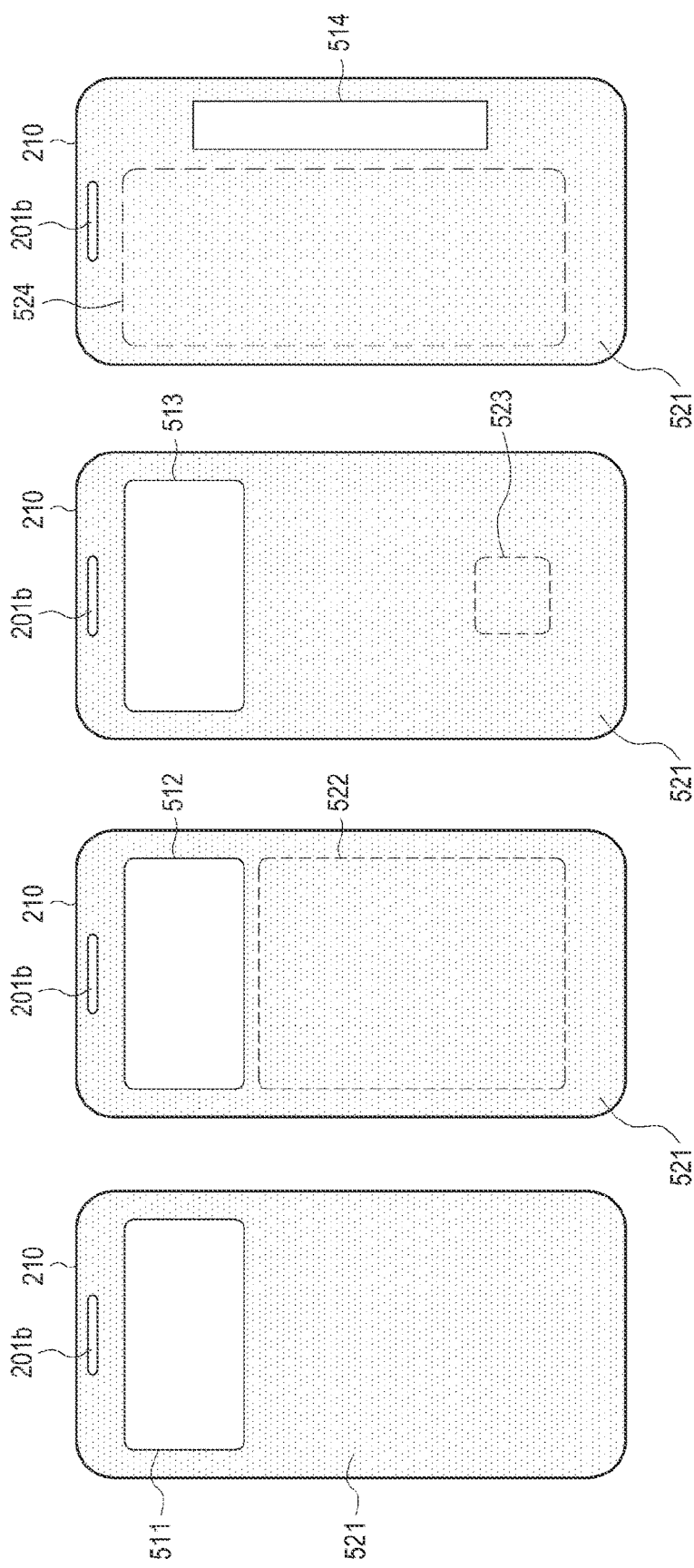

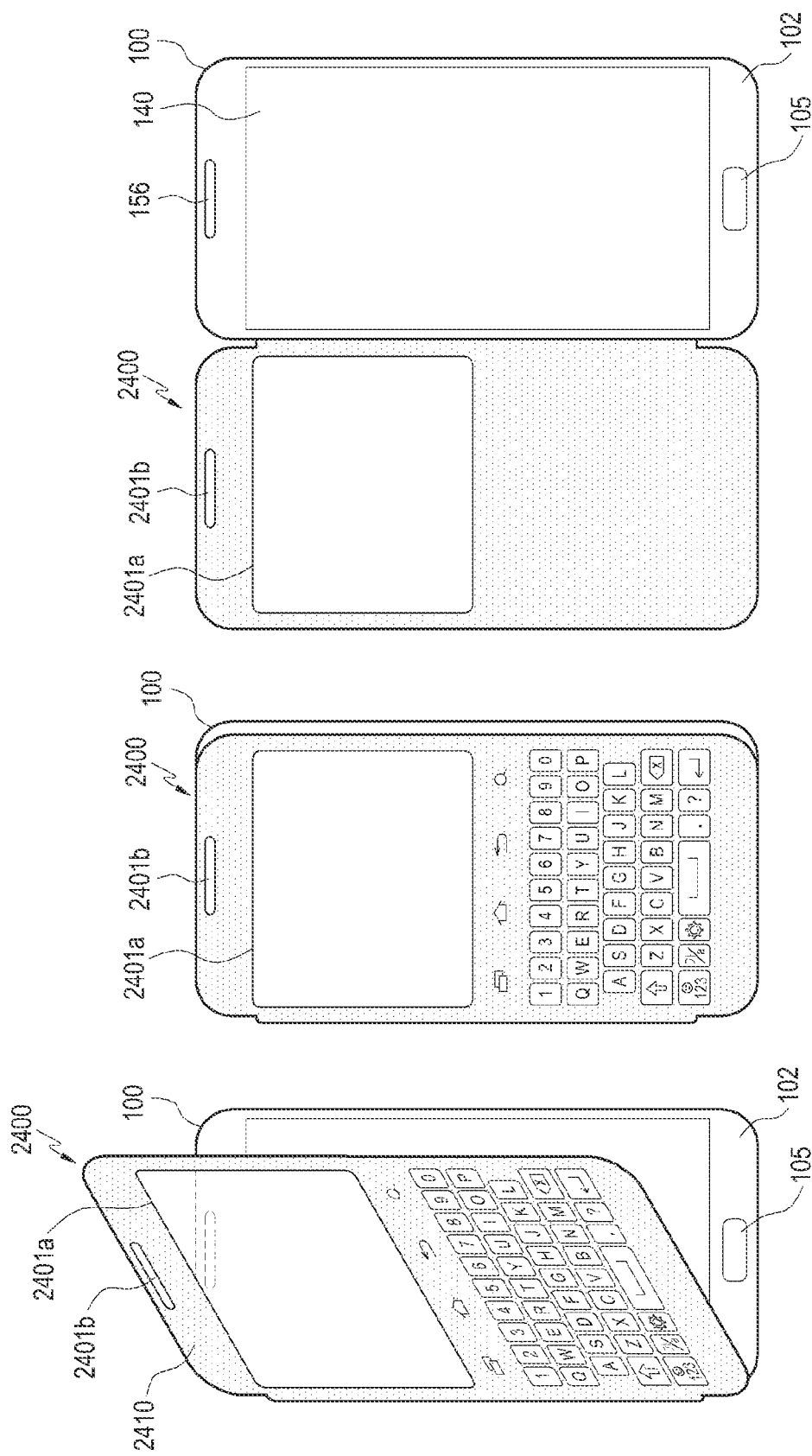

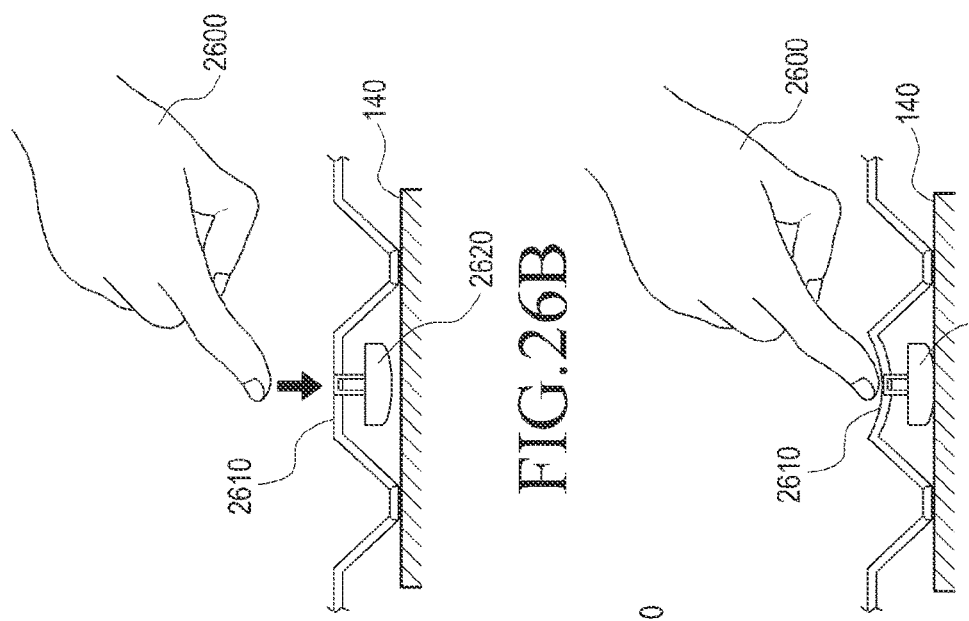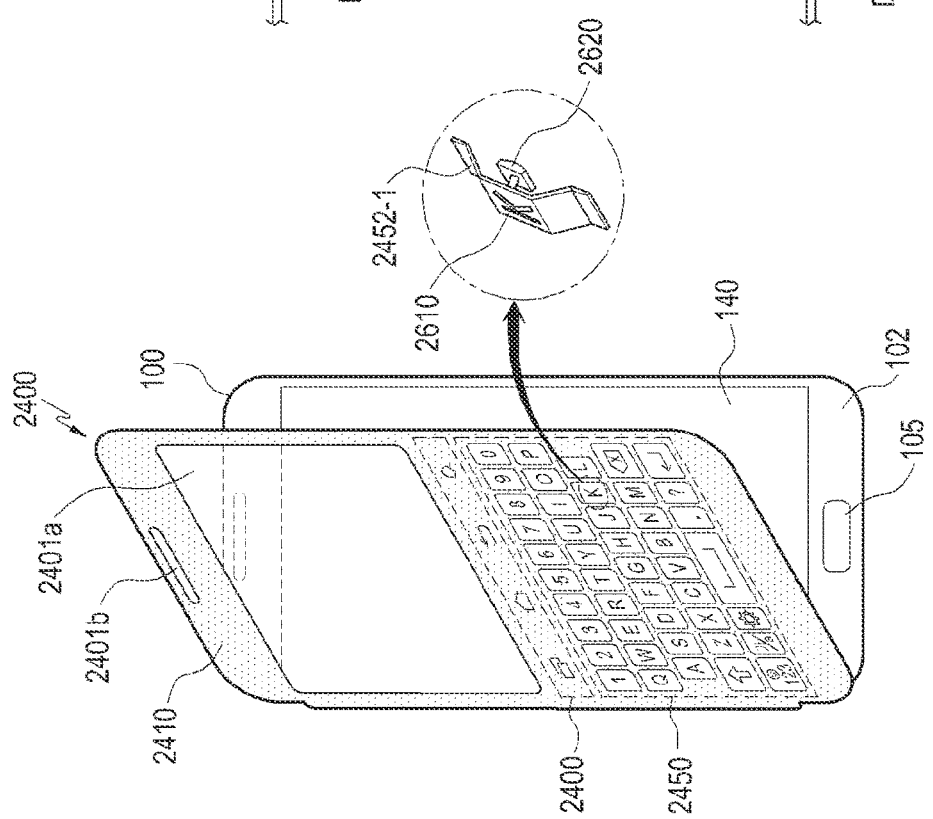

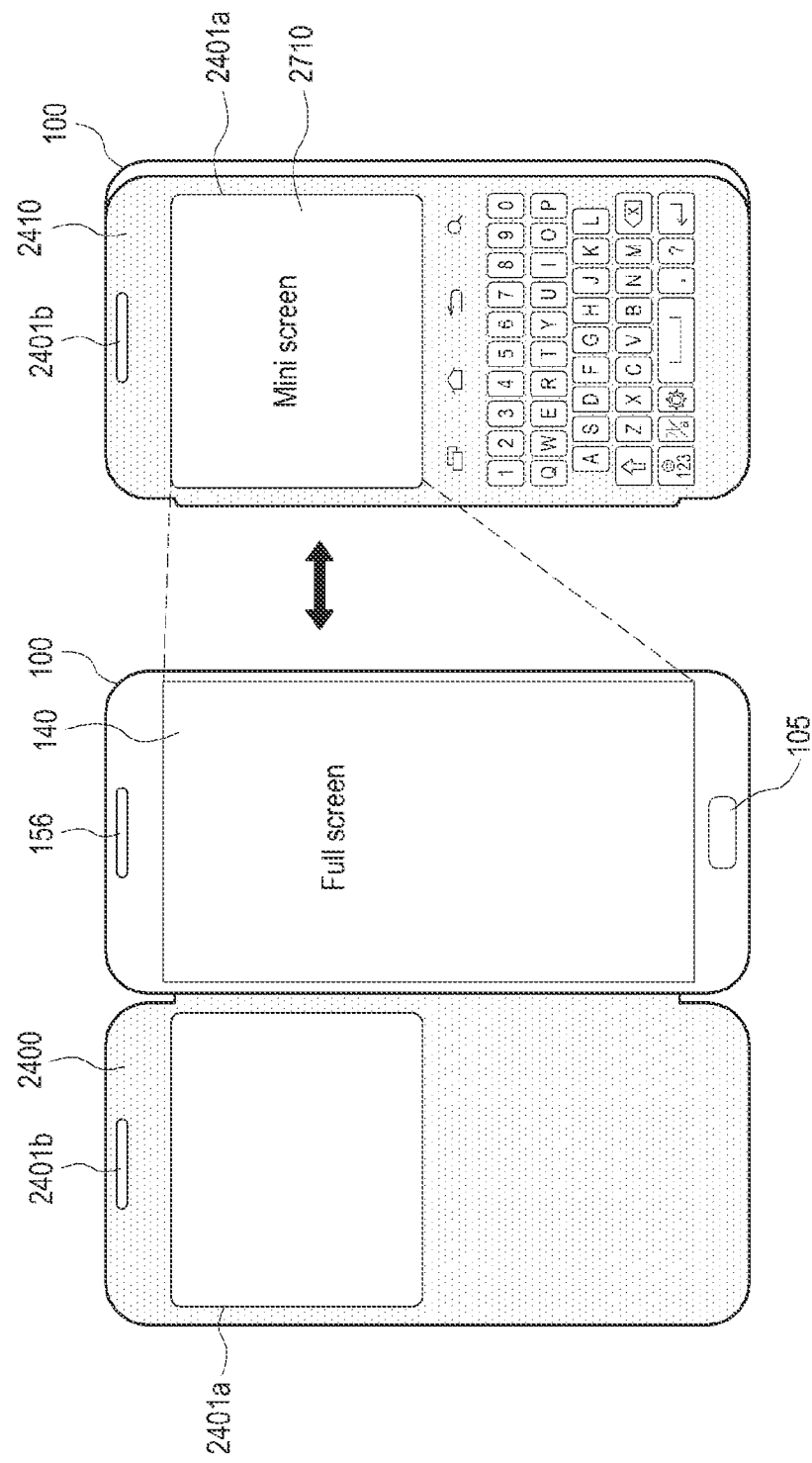

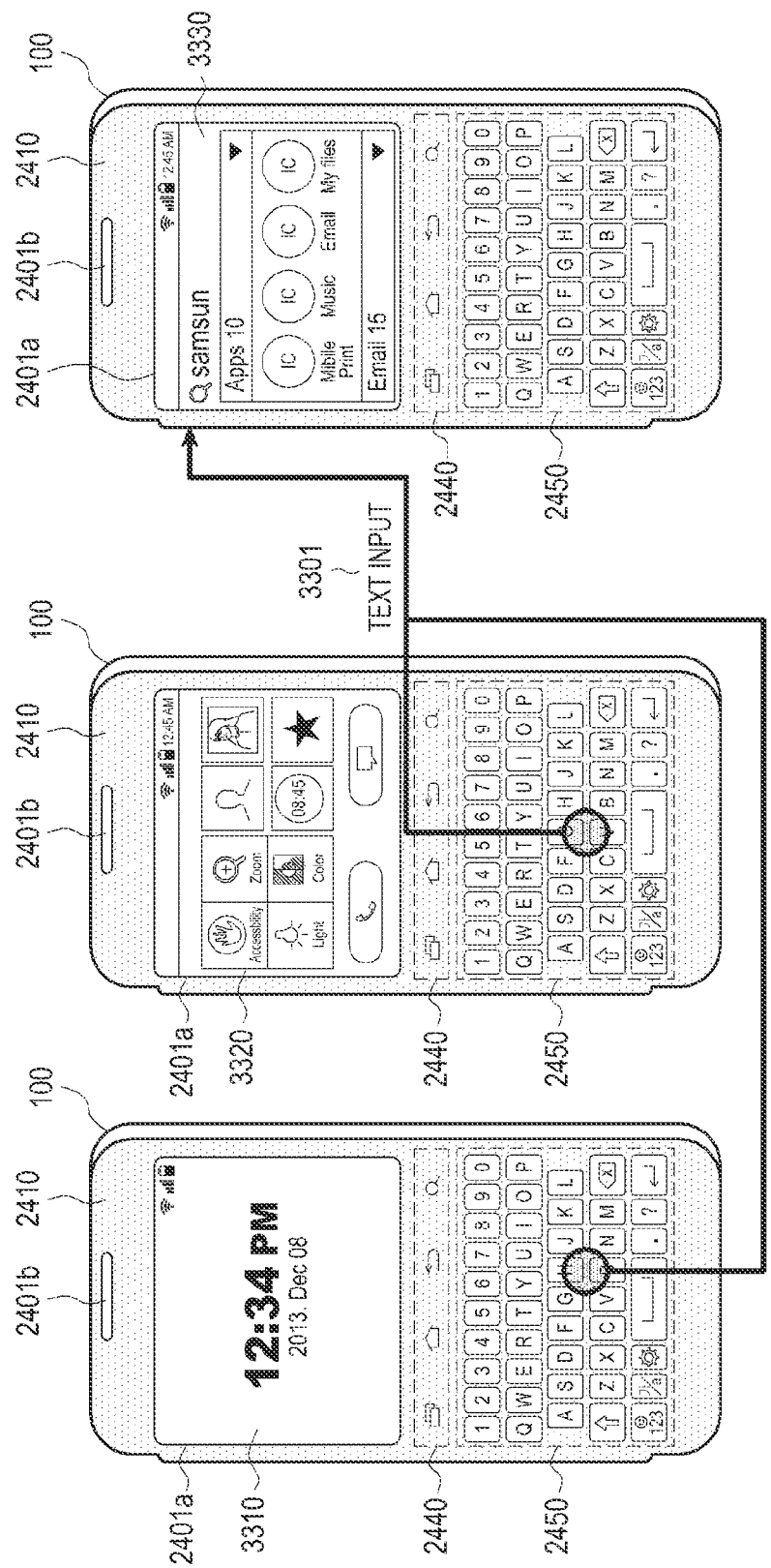

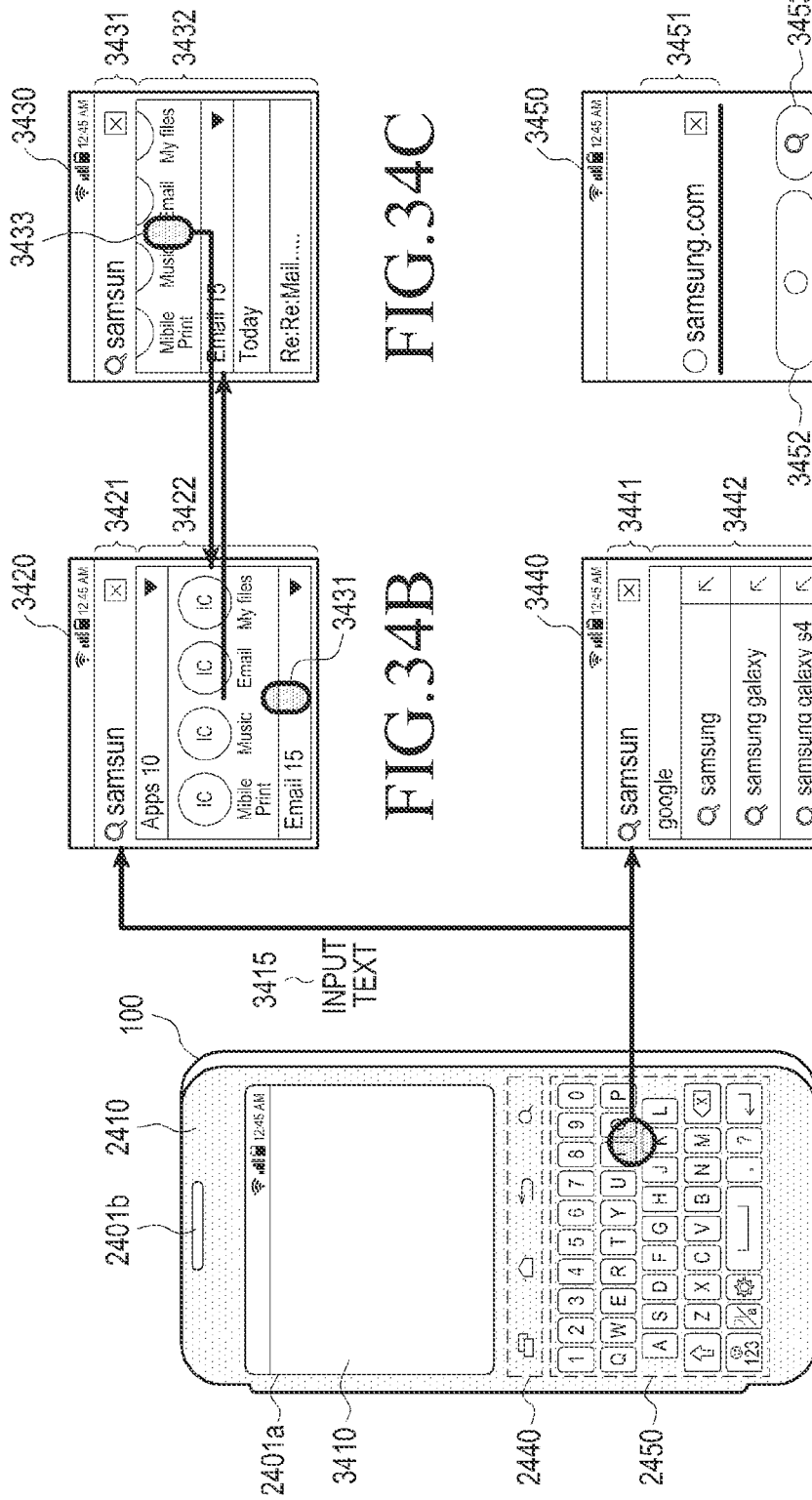

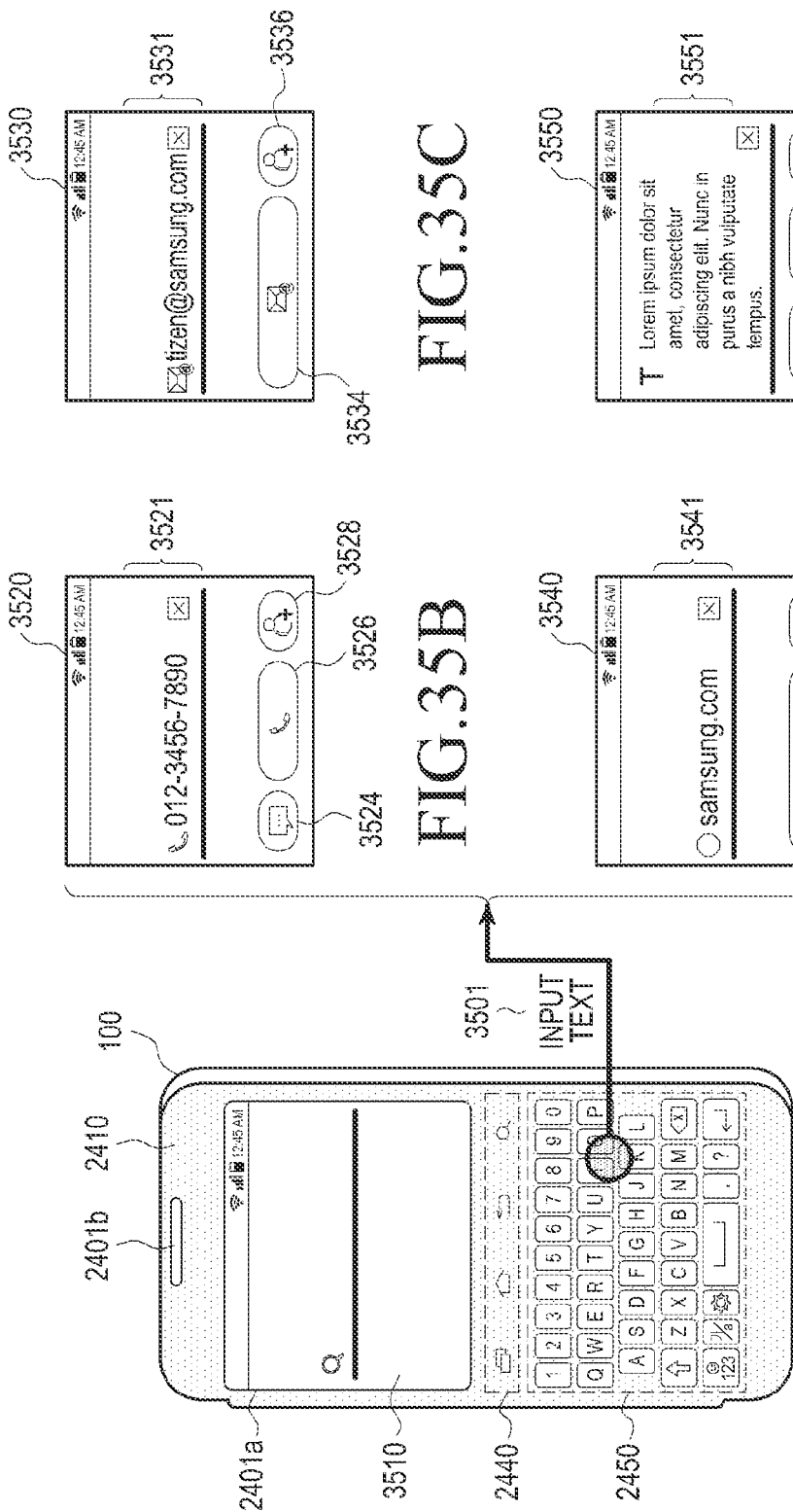

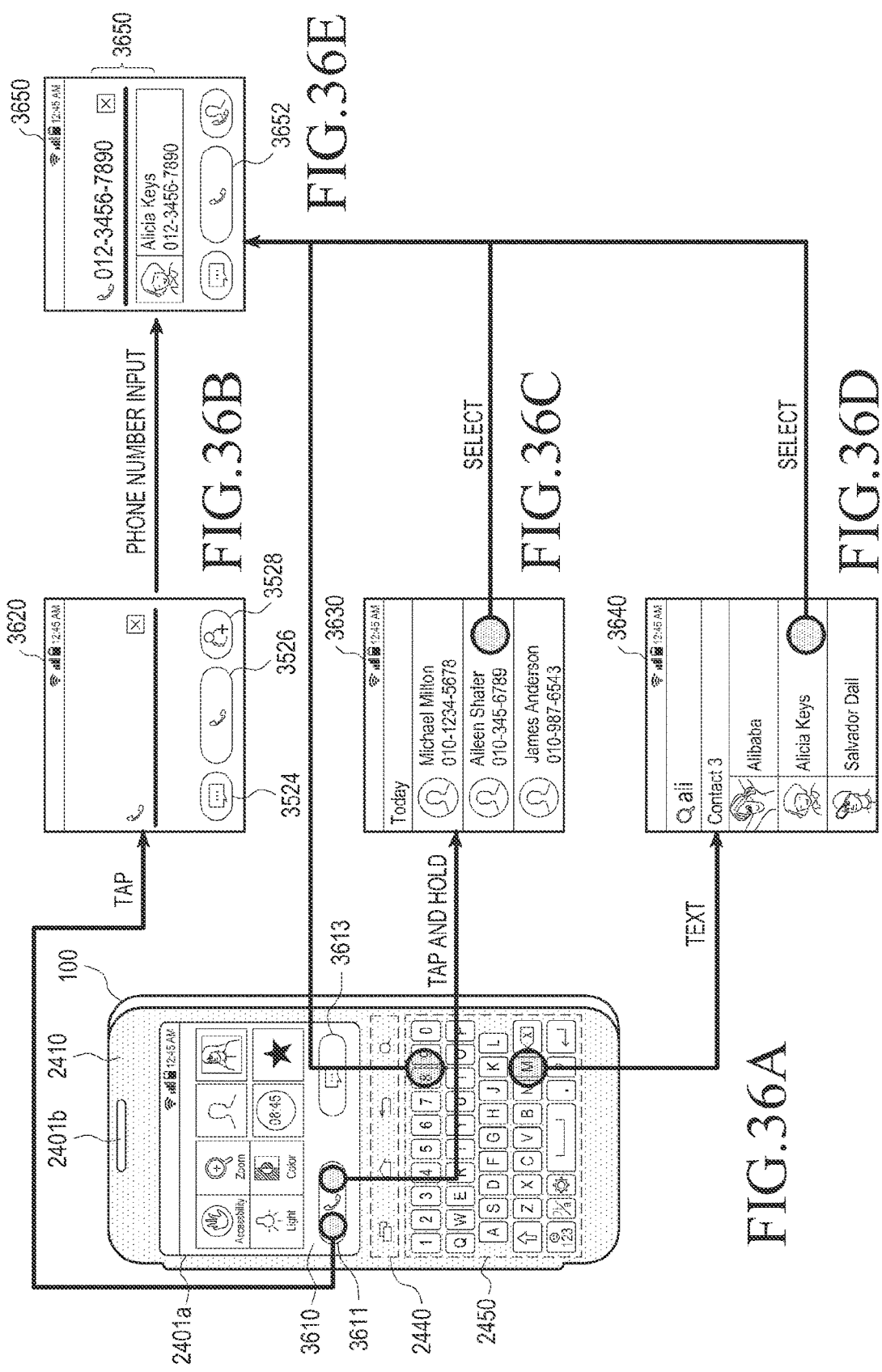

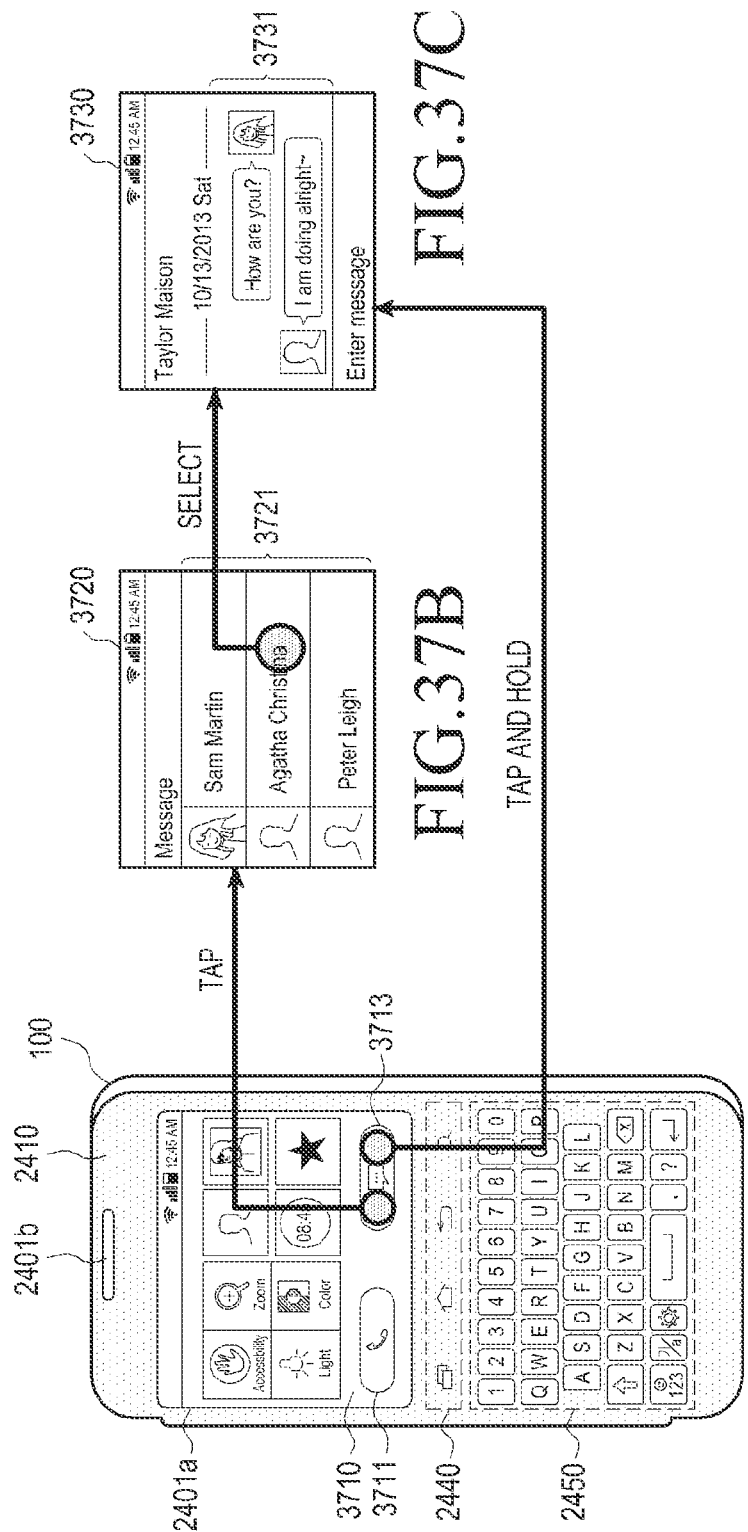

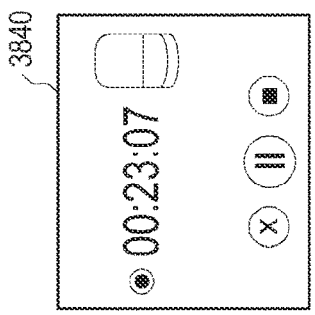
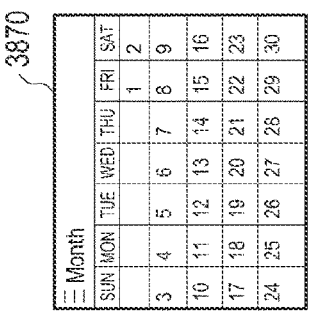
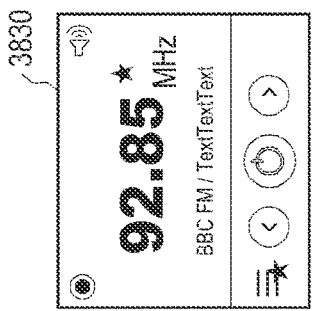
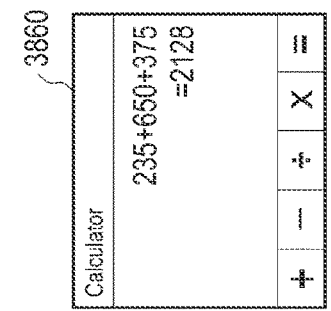
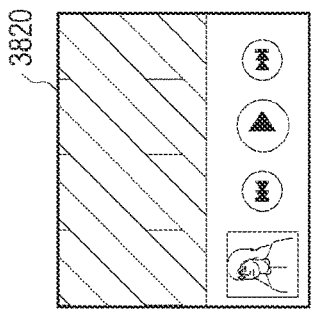
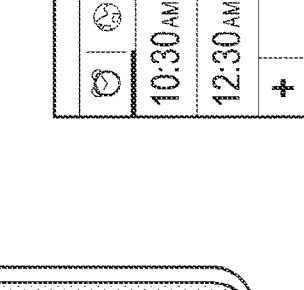
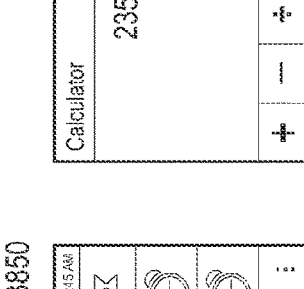
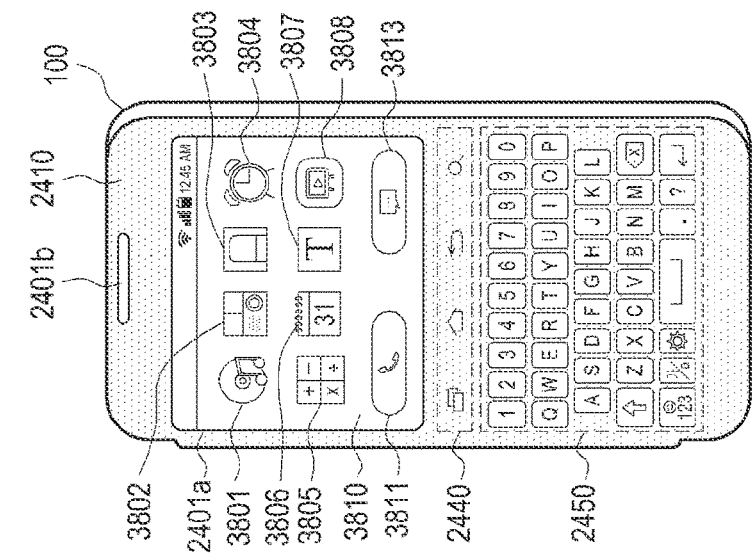
FIG.38A  FIG.38B  FIG.38C  FIG.38D  FIG.38E  FIG.38F  FIG.38G MOBILE TERMINAL, USER INTERFACE
METHOD IN THE MOBILE TERMINAL,
AND COVER OF THE MOBILE TERMINAL

PRIORITY

This application claims priority under 35 U.S.C. § 119(a) to a Korean patent application filed in the Korean Intellectual Property Office on Feb. 11, 2014 and assigned Serial No. 10-2014-0015272, the entire disclosure of which is incorporated herein by reference.

BACKGROUND OF THE INVENTION

1. Field of the Invention

The present invention relates generally to a mobile terminal, and more particularly, to a mobile terminal, a User Interface (UI) method in the mobile terminal, and a cover of the mobile terminal.

2. Description of the Related Art

Mobile terminals such as, for example, smartphones, Personal Computers (PCs), tablets, and the like, provide various useful functions to users through many applications.

Such mobile terminals are evolving to enable users to use various types of information through the various functions.

In general, a cover is configured so as to cover an entire display formed on the front surface of a mobile terminal. Since the screen of the display is covered with the cover, a user may not use the display screen.

SUMMARY OF THE INVENTION

The present invention has been made to address at least the above problems and/or disadvantages and to provide at least the advantages described below. Accordingly, an aspect of the present invention provides a mobile terminal, a User Interface (UI) method in the mobile terminal, and a cover of the mobile terminal, which even though the mobile terminal is covered with the cover, enable a user to view at least a part of a display screen of the mobile terminal.

Another aspect of the present invention is to provide a mobile terminal, a UI method in the mobile terminal, and a cover of the mobile terminal, which provide a window area to show a part of a display screen of the mobile terminal when the cover covers the display screen of the mobile terminal and which enable a user to identify an area of the display screen corresponding to the window area of the cover so that display on the area corresponding to the window area of the cover may be controlled in various manners.

In accordance with an aspect of the present invention, a method is provided for processing input in a mobile terminal. A first area of a touch screen of the mobile terminal corresponding to a window area of the cover is defined. A second area of the touch screen of the mobile terminal corresponding to a non-window area of the cover is defined. A first input in the second area is detected while the cover is closed over the touch screen. The first input is processed as a first control command.

In accordance with another aspect of the present invention, a mobile terminal is provided that includes a touch screen and a processor. The processor is configured to define a first area of the touch screen corresponding to a window area of a cover of the mobile terminal, to define a second area of the touch screen corresponding to a non-window area of the cover, to detect a first input in the second area while the cover is closed over the touch screen, and to process the first input as a first control command.

In accordance with another aspect of the present invention, a mobile terminal is provided that includes a cover including a transparent or semi-transparent window area and an opaque non-window area, for covering a touch screen of the mobile terminal. The mobile terminal also includes a touch screen that includes a first area corresponding to the window area of the cover and a second area corresponding to the non-window area of the cover. The mobile terminal further includes a processor configured to control display of information in the first area of the touch screen according to an input to the second area of the touch screen, while the touch screen is covered with the cover.

In accordance with another aspect of the present invention, a cover for a mobile terminal is provided that includes a front cover unit configured to cover a touch screen formed on a front surface of the mobile terminal. The cover also includes a rear cover unit configured to cover a rear surface of the mobile terminal. The front cover unit includes a transparent or semi-transparent window area and an opaque non-window area. The non-window area of the front cover unit includes an input area. and while the front cover unit covers the touch screen of the mobile terminal, an input is applied to the touch screen through the input area of the non-window area.

In accordance with another aspect of the present invention, an article of manufacture is provided for processing input in a mobile terminal. The article of manufacture includes a machine readable medium containing one or more programs which when executed implement the steps of: defining a first area of the touch screen corresponding to a window area of a cover of the mobile terminal; defining a second area of the touch screen corresponding to a non-window area of the cover; detecting a first input in the second area while the cover is closed over the touch screen; and processing the first input as a first control command.

BRIEF DESCRIPTION OF THE DRAWINGS

The above and other aspects, features and advantages of the present invention will be more apparent from the following detailed description when taken in conjunction with the accompanying drawings, in which:

FIGS. 5A, 5B, 5C, and 5D are diagrams illustrating various types of covers, according to embodiments of the present invention;

FIGS. 24A, 24B, and 24C are diagrams illustrating a cover having a keypad formed on it according to another embodiment of the present invention;

FIGS. 26A, 26B, and 26C are diagrams illustrating keys formed on a front cover unit, according to an embodiment of the present invention;

FIGS. 27A and 27B are diagrams illustrating a full screen and a mini screen respectively, according to an embodiment of the present invention;

FIGS. 33A, 33B, 33C, 34A, 34B, 34C, 34D, and 34E are diagrams illustrating operations triggered by text inputs through a keypad of a front cover unit in a mobile terminal, according to an embodiment of the present invention;

FIGS. 35A, 35B, 35C, 35D, and 35E are diagrams illustrating operations triggered by different types of text inputs through a keypad of a front cover unit in a mobile terminal, according to an embodiment of the present invention;

FIGS. 36A, 36B, 36C, 36D, and 36E are diagrams illustrating an operation for performing a call function, upon receipt of an input through a mini screen or a keypad of a front cover unit, while the front cover unit is closed in a mobile terminal, according to an embodiment of the present invention;

FIGS. 37A, 37B, and 37C are diagrams illustrating an operation for performing a message function, upon receipt of an input through a mini screen or a keypad of a front cover unit, while the front cover unit is closed in a mobile terminal, according to an embodiment of the present invention;

FIGS. 38A, 38B, 38C, 38D, 38E, 38F, and 38G are diagrams illustrating operations for performing various application functions, upon selection of applications on a mini screen while a front cover unit is closed in a mobile terminal, according to an embodiment of the present invention;

DETAILED DESCRIPTION OF EMBODIMENTS OF THE PRESENT INVENTION

Figure 1A:
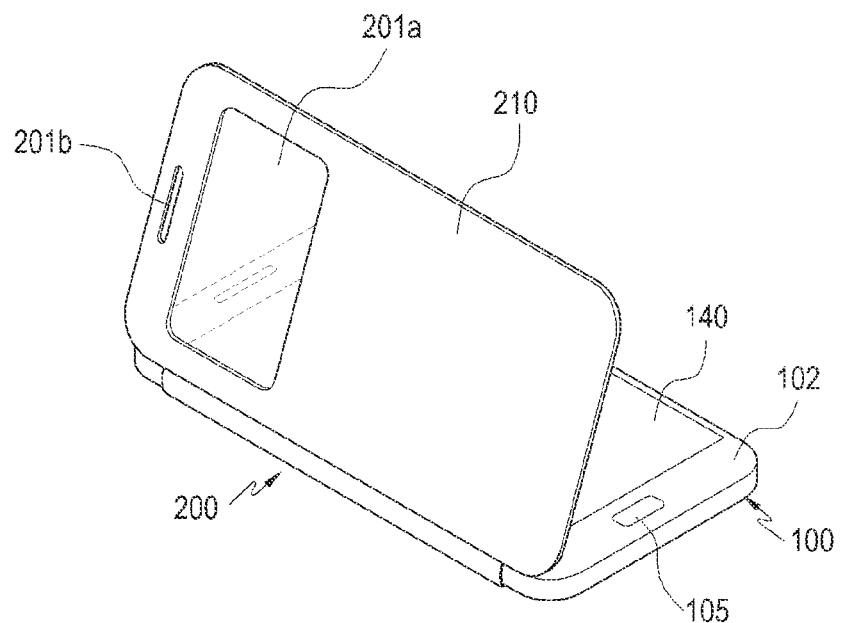
FIGS. 1A and 1B are diagrams illustrating exterior perspective views of a mobile terminal engaged with a cover, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description are not limited to the meanings provided in a standard dictionary, but, are merely used to enable a clear and consistent understanding of the disclosure. Accordingly, it should be apparent to those skilled in the art that the following description of embodiments of the present invention is provided for illustration purposes only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces.

Use of the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A mobile terminal according to various embodiments of the present invention may be embodied as an electronic device equipped with a display, such as, for example, a touch screen that can be covered with a cover. For example, the mobile terminal may be any of a video phone, a mobile phone, a smartphone, an International Mobile Telecommunication 2000 (IMT 2000) terminal, a Wideband Code Division Multiple Access (WCDMA) terminal, a Universal Mobile Telecommunication System (UMTS) terminal, a Personal Digital Assistant (PDA), a Portable Multimedia Player (PMP), a Digital Multimedia Broadcasting (DMB) terminal, an e-book reader, a laptop Personal Computer (PC), a tablet PC, a digital camera, and the like.

Figure 1B:
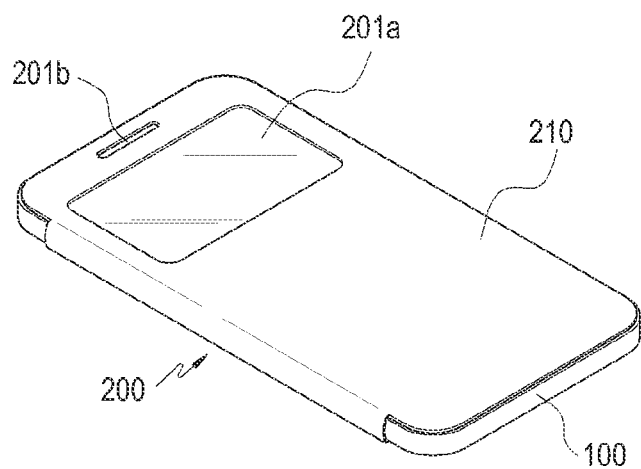
Figure 2A:
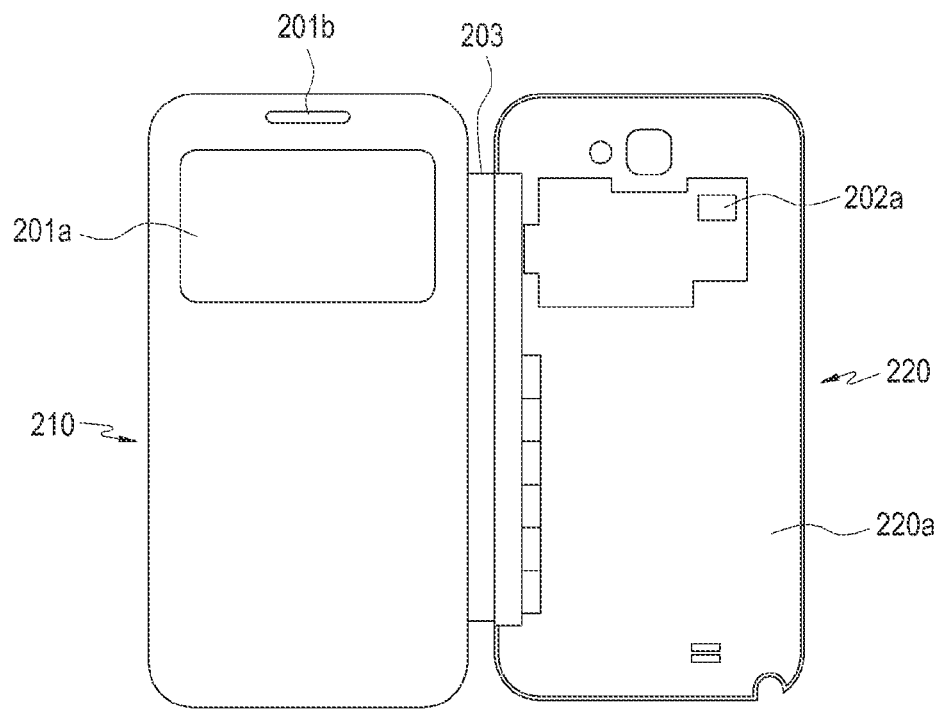
FIG. 2A is a diagram illustrating a cover of a mobile terminal, according to an embodiment of the present invention.
Figure 2B:
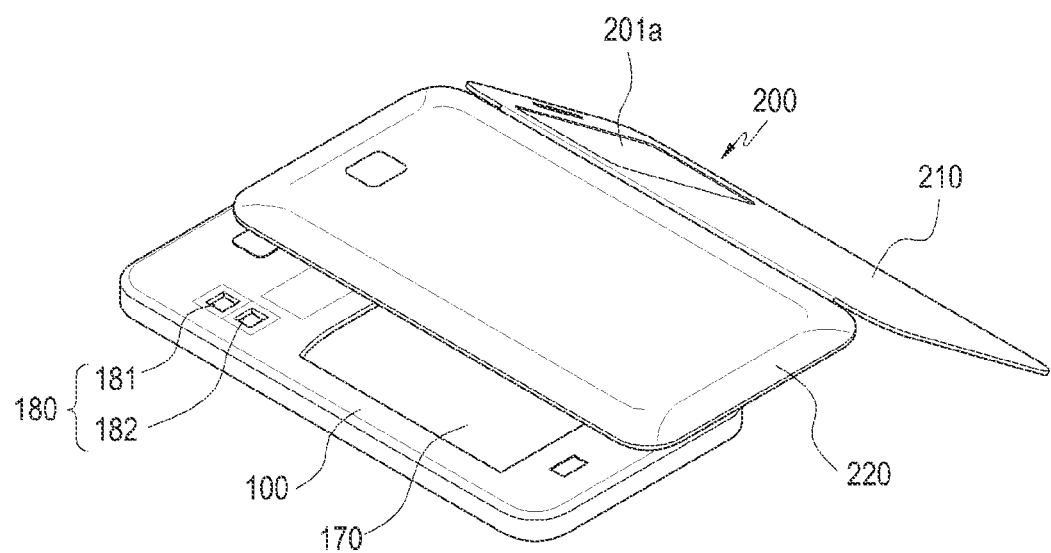
FIG. 2B is a diagram illustrating a rear surface of a cover of a mobile terminal, according to an embodiment of the present invention.

FIGS. 1A and 1B are diagrams illustrating exterior perspective views of a mobile terminal engaged with a cover, according to an embodiment of the present invention. FIG. 2A is a diagram illustrating a cover of a mobile terminal, according to an embodiment of the present invention. FIG. 2B is a diagram illustrating the rear surface of a cover of a mobile terminal, according to an embodiment of the present invention.

Referring to FIGS. 1A, 1B, 2A, and 2B, a mobile terminal 100 may be engaged with a cover 200. A display device that displays screens for multiple functions, for example, a touch screen 140 is provided on a front surface of the mobile terminal 100. A bezel 102 is formed around at least a part of the periphery of the touch screen 140 on the front surface of the mobile terminal 100. A home button 105, a speaker, a camera, a sensor, and the like, may be formed in the bezel 102. A battery 170 is mounted on a rear surface of the mobile terminal 100 to supply power to the mobile terminal 100. The battery 170 may be detachably formed on the rear surface of the mobile terminal 100, or may be built in the mobile terminal 100 so that a user may not remove the battery 170 from the mobile terminal 100. A rear cover unit 220 is provided on the rear surface of the mobile terminal 100. Connection ports 180 are provided on the rear surface of the mobile terminal 100, inside the rear cover unit 220, for electrical connection. The rear cover unit 220 is able to be engaged with the rear surface of the mobile terminal 100, covering the battery 170. The cover 200 is configured to cover at least a part of the front surface of the mobile terminal 100. When the cover 200 covers the front surface of the mobile terminal 100, a front cover unit 210 covers at least a part of the touch screen 140. Further, when the cover 200 covers the front surface of the mobile terminal 100, the front cover unit 210 covers at least a part of the bezel 102. When the front cover unit 210 covers at least a part of the touch screen 140, the remaining part of the touch screen 140 is exposed outwardly through a window area 201a formed in the front cover unit 210. The mobile terminal 100 may control display of content such as, for example, a clock, text, a number, a caller number, a user environment setting, or the like, in the part of the touch screen 140 exposed through the window area 201a of the front cover unit 210.

The front cover unit 210 of the cover 200 may be flipped open or closed. When the front cover unit 210 of the cover 200 is opened, the entire area of the touch screen 140 of the mobile terminal 100 is exposed outward, as illustrated in FIG. 1A. If the front cover unit 210 of the cover 200 is closed, at least a part of the touch screen 140 of the mobile terminal 100 is covered with the front cover unit 210, as illustrated in FIG. 1B. Referring to FIG. 1B, when the front cover unit 210 of the cover 200 is closed, at least a part of the touch screen 140 corresponding to the window area 201a is exposed outward, while the remaining part of the touch screen 140 is covered.

Further, when the front cover unit 210 of the cover 200 is closed, a part (for example, a speaker) formed in the bezel 102 of the mobile terminal 100 is exposed outwardly through an opening 201b formed in the front cover unit 210. While only one opening 201b is shown in FIG. 1B, a plurality of openings may be formed in the front cover unit 210 so that even though the front cover unit 210 is closed, a plurality of parts (for example, a speaker, a camera, and the like) formed in the bezel 102 may be exposed outwardly through the plurality of openings.

Referring to FIGS. 2A and 2B, the cover 200 includes the front cover unit 210 and the rear cover unit 220. The cover 200 further includes a connection unit 203 interposed between the front cover unit 210 and the rear cover unit 220, for connecting the front cover unit 210 to the rear cover unit 220. The connection unit 203 may cover a part of a side surface of the mobile terminal 100.

The front cover unit 210 covers the front surface of the mobile terminal 100 and includes the window area, or screen projector, 201a to expose a part of the touch screen 140. The window area 201a may be formed of a transparent or semi-transparent material or may be formed into an opening in the front cover unit 210 so that when the cover 200 covers the front surface of the mobile terminal 100, a user may view information displayed on the touch screen 140 through the window area 201a. Accordingly, the user may view information displayed on the touch screen 140 inside the front cover unit 210 through the window area 201a from outside of the front cover unit 210. Therefore, even though the front cover unit 210 is closed, the user may view short information displayed on the touch screen 140 through the window area 201a and may enter a user command through the front cover unit 210 to execute a function related to the displayed information. The rear cover unit 220 is formed as a battery cover 220a in FIG. 2B, by way of example. Referring to FIG. 2B, the rear cover unit 220 covers the rear surface of the mobile terminal 100. The rear cover unit 220 may be mounted fixedly or detachably on the rear surface of the mobile terminal 100. The front cover unit 210 may be connected to a side surface of the rear cover unit 220. The connection unit 203 may be formed between the front cover unit 210 and the rear cover unit 220. In this case, the connection unit 203 may have one side surface connected to a side surface of the rear cover unit 220 and the other side surface connected to a side surface of the front cover unit 210. The rear cover unit 220 and the front cover unit 210 may be bent upon the connection unit 203. The rear cover unit 220 is engaged with the rear surface of the mobile terminal 100. When the front cover unit 210 is flipped closed, the rear cover unit 220 surrounds at least a part of a side surface of the mobile terminal 100. Thus, the mobile terminal 100 may not slip off from the cover 200. In addition, a connector unit 202a is formed in the rear cover unit 220. The connector unit 202a provides cover type information about the cover 200. The cover type information may include information about the position of a window area and an input area formed in the front cover unit 210 of the cover 200. The connector unit 202a may provide the cover type information about the cover 200 to the mobile terminal 100 by electrically connecting to the connection ports 180 formed on the rear surface of the mobile terminal 100. For example, a plurality of connection ports 181 and 182 may be formed on the rear surface of the mobile terminal 100. The connector unit 202a of the cover 200 may be electrically engaged with at least one of the connection ports 181 and 182. The mobile terminal 100 may identify the type of the cover 200 depending on whether the connector unit 202a of the cover 200 is connected to both or one of the connection ports 181 and 182. In another example, irrespective of which connection port the connector unit 202a of the cover 200 is connected to, the mobile terminal 100 may identify the type of the cover 200.

Figure 3:
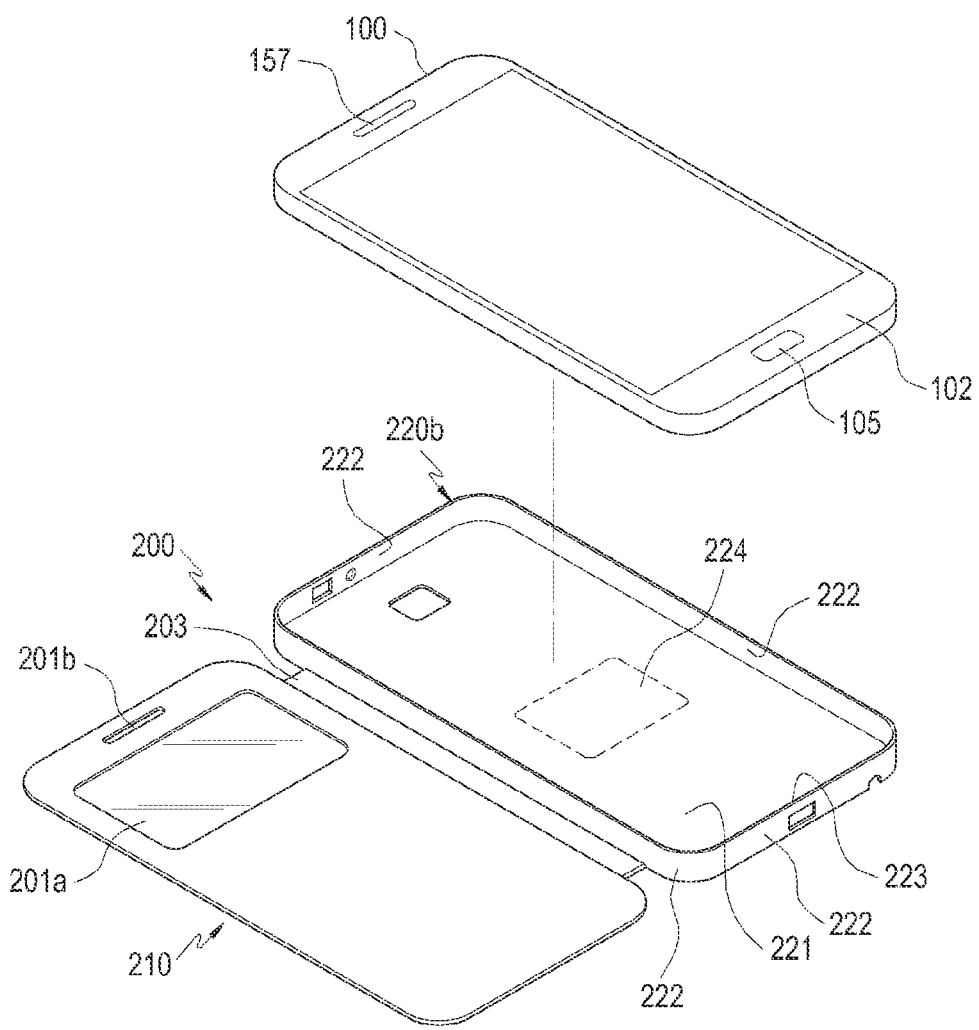
FIG. 3 is a diagram illustrating a mobile terminal and a cover, according to another embodiment of the present invention.

FIG. 3 is a diagram illustrating a mobile terminal and a cover, according to another embodiment of the present invention.

In FIG. 3, the rear cover unit 220 is formed as a rear case 220b. Referring to FIG. 3, the cover 200 includes the front cover unit 210, the connection unit 203, and the rear case 220b. The mobile terminal 100 may be fixedly inserted in the rear case 220b. The mobile terminal 100 with a battery cover 220a engaged with its rear surface may be inserted in the rear case 220b.

The rear case 220b includes a base 221, at least one sidewall 222 formed along the periphery of the base 221, and a catching portion 223. The sidewall 222 is formed substantially straight up and perpendicular from the plane of the base 221. A bottom of the sidewall 220 is connected to the base 221 and the catching portion 223 is formed in an upper end of the sidewall 222. An inner space defined by the base 221 and the sidewall 222 has a size and a shape corresponding to the size and shape of the mobile terminal 100. If the mobile terminal 100 is accommodated in the inner space, the catching portion 223 may prevent slip-off of the mobile terminal 100 from the inner space. The front cover unit 210 is connected to one side surface of the rear case 220b. The connection unit 203 may be formed between the front cover unit 210 and the rear case 220b. In this case, the connection unit 203 has one side surface connected to a side surface of the rear case 220b and the other side surface connected to a side surface of the front cover unit 210. The rear case 220b and the front cover unit 210 may be bent upon the connection unit 203.

If the window area 201a and the input area 201b are formed at predetermined positions on the front cover unit 210 of the cover 200, when the cover 200 is closed, the mobile terminal 100 may display information through the window area 201a and receive a user input through the input area 201b despite having no knowledge of cover type information about the cover 200.

In an embodiment of the present invention, a cover type information transmitter 224 may further be formed in the cover 200 for providing cover type information about the cover 200 to the mobile terminal 100 via short-range communication. The cover type information transmitter 224 may transmit the cover type information about the cover 200 to the mobile terminal 100 by a short-range communication scheme such as, for example, Near Field Communication (NFC), Radio Frequency Identification (RFID), Bluetooth, Wireless Fidelity (WiFi) Direct, or the like. The mobile terminal 100 may then identify the type of the cover 200 based on the cover type information received from the cover 100 by the short-range communication scheme.

While it has been described above, with reference to FIG. 3, that the rear cover unit 220 of the cover 200 is configured as a case, the shapes of the rear cover unit 220 and the connection unit 203 may be changed as long as the front cover unit 210 is detachably mounted to the mobile terminal 100 and flipped open or closed.

Figure 4A:
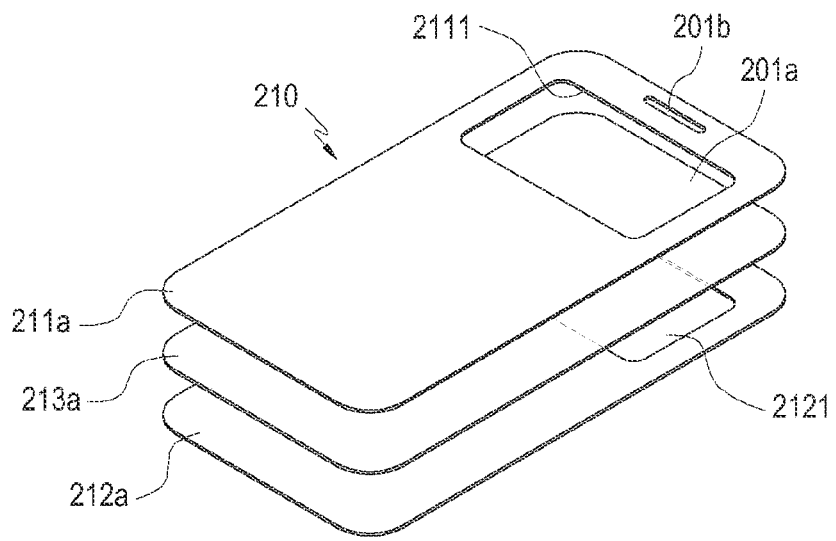
FIGS. 4A and 4B are diagrams illustrating configurations of a front cover unit, according to embodiments of the present invention.
Figure 4B:
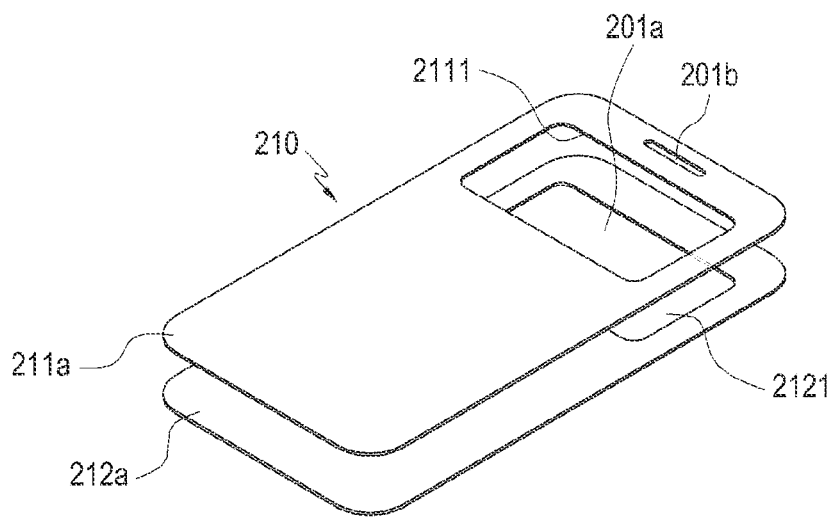

FIGS. 4A and 4B are diagrams illustrating configurations of the front cover unit, according to embodiments of the present invention. FIG. 4A illustrates the window area 201a formed of a transparent or semi-transparent material in the front cover unit 210, and FIG. 4B illustrates the window area 201a formed into a cutout opening in the front cover unit 210.

Referring to FIG. 4A, the front cover unit 210 includes an outer member 211a, an inner member 212a, and a transparent member 213a. The outer member 211a, which forms an outer surface of the front cover unit 210, may be formed of a hard material having a predetermined elasticity, such as, for example, polyurethane. The outer member 211a may be formed into a shape that may cover at least a part of the front surface of the mobile terminal 100. An outer hole 2111 is formed to define the window area 201a on the outer member 211a. The inner member 212a, which forms an inner surface of the front cover unit 210, is engaged with a bottom surface of the transparent member 213a, while a bottom surface of the inner member 212a directly contacts the touch screen 140. To keep the touch screen 140 scratch-free when the inner member 212a contacts the touch screen 140, the interior of the inner member 212a may be lined with a soft material, such as, for example, Chamude. An inner hole 2121 is formed at a position of the inner member 212a corresponding to the outer hole 2111, to define the window area 201a. The transparent member 213a is interposed between the outer member 211a and the inner member 212a and brings the outer hole 2111 and the inner hole 212 into close contact. A first area defined at a predetermined position of the touch screen 140, for example, in an upper part of the touch screen 140 may be exposed outwardly through the transparent member 213a, the outer hole 2111, and the inner hole 2121. That is, even though the first area of the touch screen 140 is covered with the front cover unit 210, the transparent member 213a may be formed of a material containing a transparent or semi-transparent material so that the user may view information displayed in the first area of the touch screen 140 through the window area 201a. For example, the transparent member 213a may be formed of a transparent or semi-transparent film. The transparent member 213a is larger is size than the window area 201a. In FIG. 4A, the transparent member 213a is as large as the outer member 211a and the inner member 212a. The transparent member 213a may be formed of a material containing a conductive material such as, for example, conductive silicon. Further, the outer member 211a, the inner member 212a, and the transparent member 213a may be formed of a material containing at least one of an anti-static electricity material, silver, and nylon fabric. Accordingly, upon receipt of a touch input in the window area 201a from the user, the touch input may be sensed in the first area of the touch screen 140 corresponding to the window area 201a. For example, when a call is incoming, a notification indicating the call incoming is displayed at a position of the touch screen 140 corresponding to the window area 201a. If the user touches the window area 201a or manipulates a predetermined key, for example, a side key, the call may be connected immediately.

Referring to FIG. 4B, the front cover unit 210 includes the outer member 211a and the inner member 212a to define the window area 201a and cover the touch screen 140, for protection. The outer member 211a, which forms the outer surface of the front cover unit 210, may be formed of a hard material having a predetermined elasticity, such as, for example, polyurethane. The outer member 211a may be formed into a shape that may cover at least a part of the front surface of the mobile terminal 100. The outer hole 2111 is formed to define the window area 201a on the outer member 211a. The inner member 212a, which forms the inner surface of the front cover unit 210, is engaged with a bottom surface of the outer member 211a, while the bottom surface of the inner member 212a directly contacts the touch screen 140. To keep the touch screen 140 scratch-free when the inner member 212a contacts the touch screen 140, the interior of the inner member 212a may be lined with a soft material, such as, for example, Chamude. The inner hole 2121 may be formed at a position of the inner member 212a corresponding to the outer hole 2111, to define the window area 201a. The outer hole 2111 and the inner hole 2121 are formed having the same size. An opening formed by the outer hole 2111 and the inner hole 2121 may form the window area 201a. Therefore, even though the first area of the touch screen 140 is covered with the front cover unit 210, the user may view information displayed on the touch screen 140 through the opening of the window area 201a. Further, the user may apply a touch input to the touch screen 140 through the window area 201a. Then the mobile terminal 100 may sense the touch input in the first area of the touch screen 140 corresponding to the window area 201a.

In an embodiment of the present invention, the remaining area of the front cover unit 210, except the window area 201a, is a non-window area. At least a part of the non-window area may be defined as an input area (hereinafter, referred to as a 'cover input area') in which a user input may be applied. For example, the whole non-window area may be the cover input area. Or a predetermined part of the non-window area may be the cover input area. The cover input area may refer to an area in which a touch input on the outer surface of the outer member 211a can be detected by the touch screen 140, with the front cover unit 210 covering the touch screen 140. Therefore, a user gesture made in the cover input area corresponding to at least a part of the non-window area may be sensed by the touch screen 140.

For example, when the user makes a user gesture in the cover input area of the front cover unit 210, the user gesture may be sensed in a second area of the touch screen 140 corresponding to the cover input area. In various embodiments of the present invention, the window area 201a of the front cover unit 210 may be formed in a first cover area of the front cover unit 210 and the non-window area may be formed in a second cover area other than the first cover area in the front cover unit 210.

FIGS. 5A, 5B, 5C, and 5D are diagrams illustrating various types of covers, according to embodiments of the present invention.

Referring to FIG. 5A, a window area 511 is defined in a part of an upper portion of the front cover unit 210 and the remaining area of the front cover unit 210, except the window area 511, is defined as a non-window area 521 in a first-type cover, according to an embodiment of the present invention. The whole non-window area 521 may be a cover input area in the first-type cover.

Referring to FIG. 5B, a window area 512 is defined in a part of an upper portion of the front cover unit 210 and the remaining area of the front cover unit 210, except the window area 512, is defined as the non-window area 521 in a second-type cover, according to an embodiment of the present invention. In the second-type cover, an area of a predetermined size in the non-window area 521 under the window area 512 may be defined as a cover input area 522. In FIG. 5B, the cover input area 522 may be substantially as wide as the window area 512 along a horizontal direction and may extend up to the vicinity of the window area 512 and down to the vicinity of a bottom end of the front cover unit 210. Accordingly, for example, the cover input area 522 may occupy most of the non-window area 521 under the window area 512.

Referring to FIG. 5C, a window area 513 is defined in a part of an upper portion of the front cover unit 210 and the remaining area of the front cover unit 210, except the window area 513, is defined as the non-window area 521 in a third-type cover, according to an embodiment the present invention. In the third-type cover, a small area at a center of the non-window area 521 under the window area 513 may be defined as a cover input area 523. The cover input area 523 is smaller in the third-type cover than the cover input area 522 in the second-type cover, by way of example.

Referring to FIG. 5D, a window area 514 is elongated in a right portion of the front cover unit 210 along the length direction of the front cover unit 210, and the remaining area of the front cover unit 210, except the window area 514, is defined as the non-window area 521 in a fourth-type cover, according to an embodiment of the present invention. A cover input area 524 is defined in a part of the non-window area 521 to the left of the window area 514.

While the single window areas 511, 512, 513, and 514 are formed in the front cover unit 210 in FIGS. 5A, 5B, 5C, and 5D, by way of example, the positions or number of window areas may be changed. For example, the window areas 511, 512, 513, and 514 may be provided at the center of the front cover unit 210 or may be elongated along the horizontal direction. Thus the positions of the window areas 511, 512, 513, and 514 may vary. While it has been described that one window area is defined in the front cover unit 210 in the embodiments of the present invention, a plurality of window areas may be defined in the front cover unit 210, according to various embodiments of the present invention. Further, at least a part of the non-window area 521 may be used as a cover input area. For example, the whole or a part of the non-window area 521 may be defined as the cover input area. Upon input of a user gesture (for example, a touch input) made in the cover input area, the user gesture may be detected in the second area of the touch screen 140 corresponding to the cover input area.

The mobile terminal 100 may distinguish the window area from the cover input area in the front cover unit 210, according to the above-described various types of covers. Therefore, the mobile terminal 100 may define the first and second areas on the touch screen 140 in correspondence with the window area and the cover input area of the front cover unit 210, respectively.

In various embodiments of the present invention, the front cover unit 210 of the mobile terminal 100 may cover the touch screen 140 on the front surface of the mobile terminal 100 and the mobile terminal 100 may determine whether the touch screen 140 has been covered with the front cover unit 210.

Figure 6:
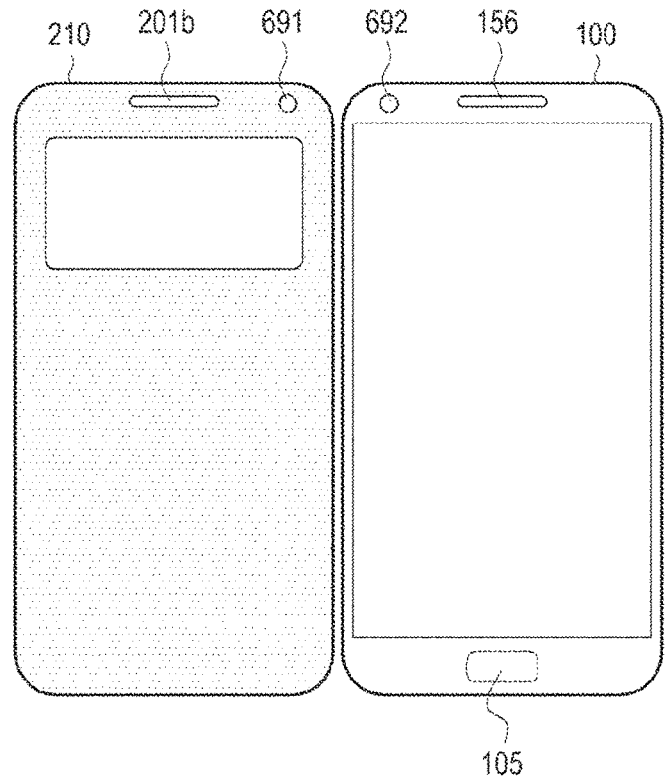
FIG. 6 is a diagram illustrating an operation for determining whether a mobile terminal is covered with a cover, according to an embodiment of the present invention.

FIG. 6 is a diagram illustrating an operation for determining whether a mobile terminal is covered with a cover, according to an embodiment of the present invention.

Referring to FIG. 6, the cover 200 includes a magnetic force applier 691, in the interior of the front cover unit 210, that provides cover type information about the cover 200.

The magnetic force applier 691 may be, for example, a permanent magnet and may exert a magnetic force. The magnetic force applier 691 may generate a magnetic force corresponding to cover type information.

For example, if the front cover unit 210 covers the front surface of the mobile terminal 100, a sensor unit 160 including at least one magnetic force sensor 692 may sense a magnetic force exerted from the magnetic force applier 691, and the mobile terminal 100 may determine whether the front cover unit 210 has covered the front surface of the mobile terminal 100 based on a sensing result of the magnetic force sensor 692 of the sensor unit 160. Further, when the front cover unit 210 covers the front surface of the mobile terminal 100, the sensor unit 160 including the at least one magnetic force sensor 692 may sense a magnetic force exerted from the magnetic force applier 691 corresponding to cover type information, and the mobile terminal 100 may determine the cover type information about the cover 200 based on a sensing result of the magnetic force sensor 692 of the sensor unit 160.

In an embodiment of the present invention, the touch screen 140 of the mobile terminal 100 may display a screen and sense a touch, independently. The mobile terminal 100 may activate a display screen of the touch screen 140 fully or partially according to the first and second areas depending on whether the front cover unit 210 has covered the touch screen 140. Or the mobile terminal 100 may activate a touch sensing area of the touch screen 140 fully or partially according to the first and second areas depending on whether the front cover unit 210 has covered the touch screen 140.

For example, if the front cover unit 210 has not covered the touch screen 140, the mobile terminal 100 may activate the full display screen of the touch screen 140 and the full touch sensing area of the touch screen.

On the other hand, if the front cover unit 210 has covered the touch screen 140, the mobile terminal 100 may activate information display and touch sensing for the first area and only touch sensing for the second area on the display screen of the touch screen 140. In this case, the remaining area except the first and second areas may be deactivated in the display screen of the touch screen 140.

The mobile terminal 100 may receive cover type information from a cover type information provider 710 of the cover 200. The cover type information provider 710 may be one of the connector unit 202a, the cover type information transmitter 224, and the magnetic force applier 691.

Figure 7:
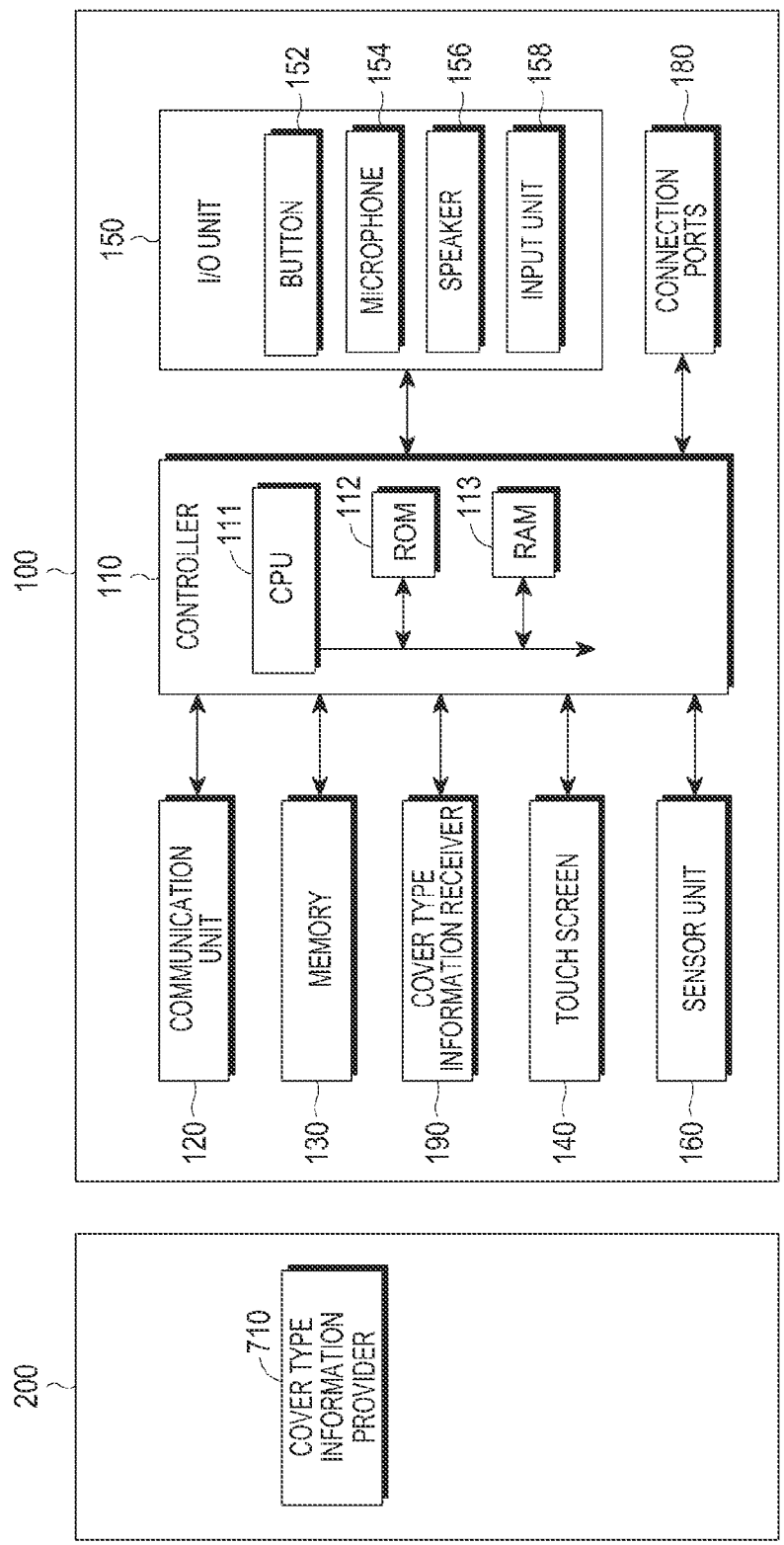
FIG. 7 is a block diagram of a mobile terminal, according to an embodiment of the present invention.

FIG. 7 is a block diagram of the mobile terminal 100, according to an embodiment of the present invention.

Referring to FIG. 7, the mobile terminal 100 includes a controller 110, a communication unit 120, a memory 130, the touch screen 140, and an Input/Output (I/O) unit 150.

The controller 110 includes a Central Processing Unit (CPU) 111. The controller 110 may include a Digital Signal Processor (DSP) and may be referred to as a processor. The controller 110 includes a Read Only Memory (ROM) 112 for storing a control program to control the mobile terminal 100, and a Random Access Memory (RAM) 113 for storing signals or data received from the outside of the mobile terminal 100 or for use as a memory space for an operation performed by the mobile terminal 100. The CPU 111 may include one or more cores. The CPU 111, the ROM 112, and the RAM 113 may be interconnected by an internal bus. The controller 110 may control the communication unit 120, the memory 130, the touch screen 140, and the I/O unit 150. For example, the controller 110 may provide overall control to the mobile terminal 100 and may control a signal flow between the above components.

The controller 110 may distinguish a window area from a cover input area in the front cover unit 210 of the cover 200 according to the type of the cover 200. Accordingly, the controller 110 may define first and second areas on the touch screen 140, corresponding to the window area and the cover input area of the front cover unit 210.

When the front cover unit 210 is closed, and thus covers the touch screen 140, the controller 110 may activate the first and second areas of the touch screen 140, while deactivating the remaining area of the touch screen 140. Therefore, the controller 110 may detect a user gesture input to the first and second areas of the touch screen 140 through the front cover unit 210.

The controller 110 may control setting of different touch input sensitivities for different areas of the touch screen 140. For example, the controller 110 may set a larger touch input sensitivity in the second area of the touch screen 140 than in the first area of the touch screen 140. For example, if the front cover unit 210 is closed, the controller 110 may set the touch input sensitivity to be larger in the second area than in the first area of the touch screen 140. The touch input sensitivities of the first and second areas of the touch screen 140 may be set to be large enough for the touch screen 140 to detect a user gesture made on the front cover unit 210, even though the front cover unit 210 covers the touch screen 140.

Further, the controller 110 may control setting of different touch input sensitivities with which to sense a touch input in the first and second areas of the touch screen depending on whether the front cover unit 210 covers the touch screen 140. For example, if the cover 200 does not cover the touch screen 140, the controller 110 may control setting of the same touch input sensitivity across the entire touch screen 140. On the other hand, if the front cover unit 210 covers the touch screen 140, the controller 110 may control setting of a higher touch input sensitivity in the second area than in the first area. Therefore, even when the window area is thicker than the non-window area or the window area is opened while the non-window area is closed, a touch input to the second area may be sensed normally. The controller 110 may identify the type of the cover 200 and determine whether the front cover unit 210 covers a display screen of the touch screen 140 by receiving cover type information through the sensor unit 160, the connection ports 180, or a cover type information receiver 190. The controller 110 may define areas including, for example, a first area corresponding to the window area of the front cover unit 210 and a second area corresponding to the cover input area of the front cover unit 210, on the touch screen 140 according to the cover type. For example, while the cover 200 of the front cover unit 210 covers a display screen of the touch screen 140, the controller 110 may determine whether an event has occurred. Upon occurrence of an event, the controller 110 may define, on the touch screen 140, areas including, for example, the first area corresponding to the window area of the cover 200, for example, the front cover unit 210 and the second area corresponding to the cover input area of the cover 200, for example, the front cover unit 210. The event may include at least one of a predetermined button input event, a reception event, and a notification event. The reception event may include, for example, a call incoming event and a message reception event. The notification event may include, for example, a time alarm event, a schedule alarm event, and the like. There may be many other events. The event may be any event as far as it triggers definition of areas including the first and second areas on a display screen.

The communication unit 120 may connect the mobile terminal 100 to an external device through one or more antennas and may communicate with the external device. The external device may include another device, a portable phone, a smartphone, a tablet PC, and a server. The communication unit 120 may include various communication modules such as, for example, a mobile communication module, an NFC module, a Bluetooth module, and the like, and may communicate with an external device by various communication schemes such as mobile communication, NFC, Bluetooth, or the like.

For example, the mobile terminal 100 may transmit wireless signals to or receive wireless signals from a portable phone, a smartphone, a tablet PC, or another device that has a phone number input to the mobile terminal 100, for a voice call, a video call, a Short Message Service (SMS), or a Multimedia Messaging Service (MMS) through the mobile communication module. Further, the mobile terminal 100 may receive information from an external device through the NFC module or the Bluetooth module. In various embodiments of the present invention, the communication unit 120 may include at least one of a Wireless Local Area Network (WLAN) module and another short-range communication module in addition to the NFC module and the Bluetooth module and may receive information through at least one of the WLAN module and the short-range communication module. The WLAN module may be connected to the Internet under the control of the controller 110 in a place where a wireless Access Point (AP) is installed. The WLAN module may support the WLAN standard IEEE802.11x of the Institute of Electrical and Electronics Engineers (IEEE). The short-range communication module may conduct short-range wireless communication between the mobile terminal 100 and an external device under the control of the controller 110. The short-range communication may conform to InfraRed Data Association (IrDA) and the like.

The memory 130 may store input/output signals or data in accordance with operations of the controller 110, the communication unit 120, the touch screen 140, and the I/O unit 150, under the control of the controller 110. The memory 130 may store a plurality of programs for controlling the mobile terminal 100 or the controller 110, a plurality of applications, and programs and data for executing various functions.

The term "memory" may include the ROM 112 and the RAM 113 within the controller 110, or a memory card (for example, a Secure Digital (SD) card, a memory stick, etc.) mounted to the mobile terminal 100. The memory 130 may include a non-volatile memory, a volatile memory, a Hard Disk Drive (HDD), a Solid State Drive (SSD), and the like.

The memory 130 may be a machine-readable medium (for example, a computer-readable medium). The machine-readable medium may be defined as a medium that provides data to a machine so that the machine may perform a specific function. The machine-readable medium may be a storage medium. The memory 130 may include a non-volatile medium and a volatile medium. All these media should be of a type providing commands detectable to a physical device that reads commands to a machine. The machine-readable medium includes, but is not limited to, at least one of a floppy disk, a flexible disk, a hard disk, a magnetic tape, a Compact Disk Read Only Memory (CD-ROM), an optical disk, a punch card, a paper tape, a RAM, a Programmable ROM (PROM), an Erasable PROM (EPROM), and a Flash-EPROM. In an embodiment of the present invention, the memory 130 may store cover type information.

The touch screen 140 may provide various Graphical User Interfaces (GUIs) to a user. For example, the touch screen 140 may receive various gesture inputs including at least one touch input or proximity input through a user's body part (for example, a finger) or a touch input unit 158 (for example, a pen). The touch screen 140 may be implemented as, for example, a resistive type, a capacitive type, an ElectroMagnetic Resonance (EMR) type, or a combination of them.

In an embodiment of the present invention, the touch screen 140 may display execution screens of applications, a message screen, a message writing screen, a message reception screen, and the like under the control of the controller 110. Further, the touch screen 140 may display information in a predetermined partial area of a display screen, for example, the first area of the touch screen 140 corresponding to the window area 201a, while not displaying information in an area other than the first area.

The I/O module 150 includes a button 152, a microphone 154, a speaker 156, and the input unit 158, to which the I/O module 150 is not limited. A cursor control such as, for example, a mouse, a trackball, a joystick, or cursor directional keys may be provided for communication with the controller 110 and for control of cursor movement on the touch screen 140.

One or more buttons 152 may be provided in the mobile terminal 100 and may provide various input signals corresponding to a user's pressings to the controller 110.

The microphone 154 may receive a voice or a sound from various sound sources and convert the received voice or sound to an electrical signal under the control of the controller 110.

The speaker 156 may output sounds corresponding to various signals (for example, a wireless signal, a broadcast signal, a digital audio file, a digital video file, and the like) along with execution of applications to the outside of the mobile terminal 100 under the control of the controller 110.

The input unit 158 may be a device or an object that is configured to be inserted and kept inside the mobile terminal 100, or that is configured separately. In the former case, the input unit 158 may be removed from or inserted into the mobile terminal 100. The input unit 158 may be a user's finger or an input means such as a stylus pen (hereinafter, referred to as a pen), which may input a user gesture by approaching or touching the touch screen 140.

The mobile terminal 100 may further include the sensor unit 160. The sensor unit 160 may include at least one magnetic force sensor 692. The sensor unit 160 may sense a magnetic force exerted from the permanent magnet 691 of the cover 200.

The mobile terminal 100 may further include the connection ports 180. The connection ports 180 may be connected to the connector unit 202a of the cover 200. Once the connection ports 180 are connected to the connector unit 202a, the connection ports 180 may receive cover type information about the cover 200 from the connector unit 202a.

The mobile terminal 100 may further include the cover type information receiver 190. The cover type information receiver 190 may receive cover type information from the cover type information transmitter 224. If the cover type information receiver 190 is configured as a short-range communication module, when the front cover unit 210 covers the front surface of the mobile terminal 100, the cover type information receiver 190 may receive cover type information from the cover type information transmitter 224, and the controller 110 may determine whether the front cover unit 210 covers the touch screen 140 based on the cover type information received from the cover type information receiver 190.

Figure 8:
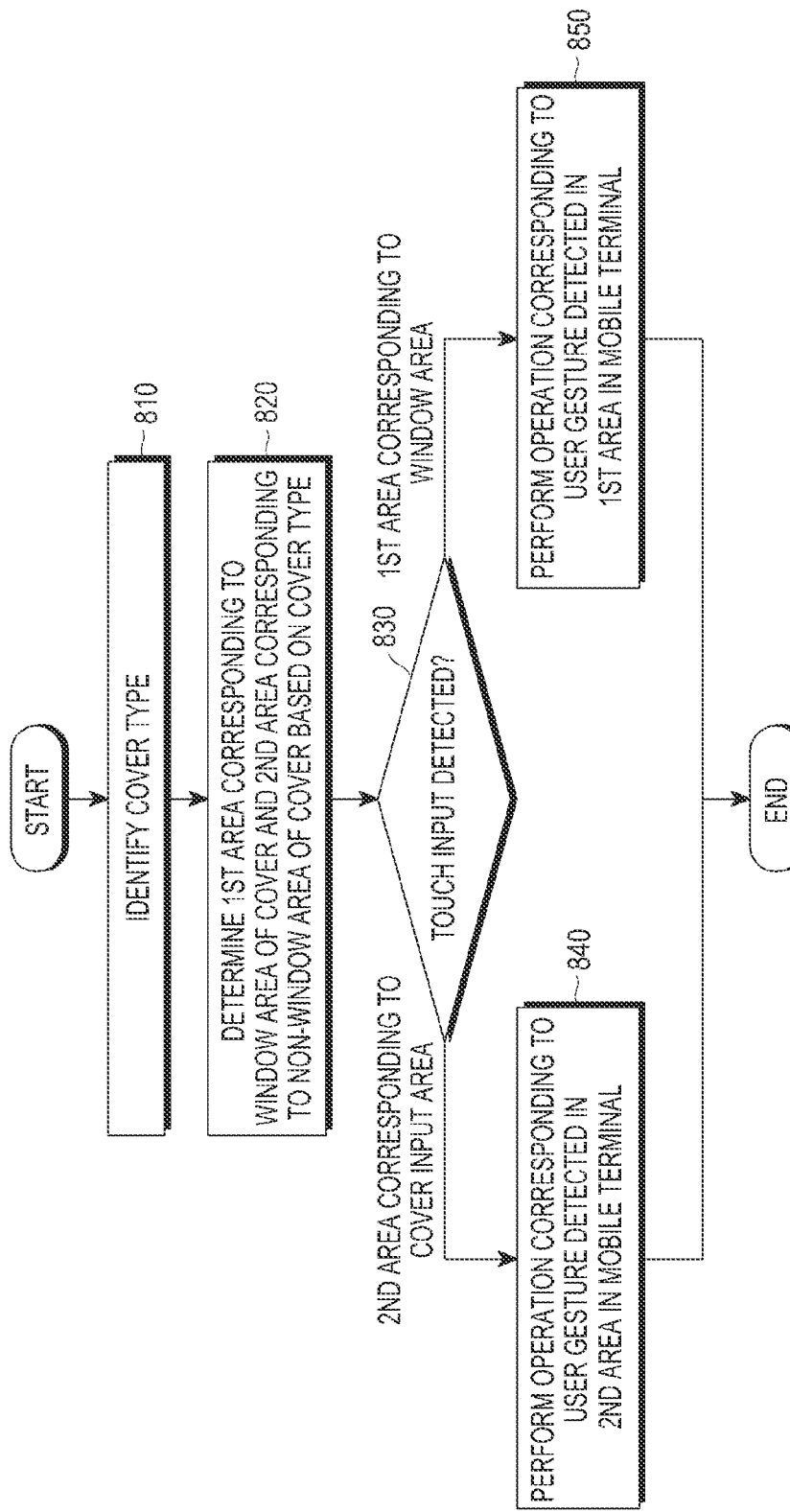
FIG. 8 is a flowchart illustrating a UI operation using a first area and a second area defined on a touch screen, respectively corresponding to a window area and a cover input area of a cover, in a mobile terminal, according to an embodiment of the present invention.

FIG. 8 is a flowchart illustrating a UI operation using a first area and a second area defined on the touch screen 140, which respectively correspond to a window area and a cover input area of the cover 200 in the mobile terminal 100, according to an embodiment of the present invention.

Referring to FIG. 8, the mobile terminal 100 identifies the cover type of the cover 200, in step 810. For example, the controller 110 of the mobile terminal 100 may identify the cover type of the cover 200 by sensing a magnetic force exerted from the cover 200 or by receiving cover type information about the cover 200 from the cover 200. The cover type information about the cover 200 may include information about the positions of a window area and a cover input area defined on the cover 200. The cover type information about the cover 200 may include a cover Identifier (ID), and the controller 110 may determine the positions of the window area and the cover input area of the cover 200 using the cover ID. In this case, information about the positions of the window area and the cover input area of the cover 200 for various cover IDs may be pre-stored in the memory 130. The cover type information may further include information about at least one of a size and position of the cover 200 and a position of a non-window area of the cover 200.

In step 820, the controller 110 determines a touch screen area of the touch screen 140 including a first area corresponding to the window area of the cover 200 and a second area corresponding to the cover input area of the cover 200, based on the cover type information about the cover 200.

With the front cover unit 210 of the cover 200 closed, the controller 110 determines whether a user gesture has been input on the touch screen 140 through the front cover unit 210, in step 830.

If a user gesture is detected in the second area of the touch screen 140 corresponding to the cover input area of the front cover unit 210, the controller 110 performs an operation corresponding to the detected user gesture in the mobile terminal 100 in step 840.

If a user gesture is detected in the first area of the touch screen 140 corresponding to the window area of the front cover unit 210, the controller 110 performs an operation corresponding to the detected user gesture in the mobile terminal 100, in step 850.

For example, with the touch screen 140 of the mobile terminal 100 covered with the front cover unit 210, the controller 110 may determine whether an event has occurred in the mobile terminal 100 and may display information corresponding to the event in the first area of the touch screen 140 corresponding to the window area of the front cover unit 210. The controller 110 performs a predetermined operation according to a user gesture input to the second area of the touch screen 140, corresponding to the cover input area of the front cover unit 210. The event may include, for example, at least one of a predetermined button input event, a reception event, and a notification event. The reception event may include, for example, a call incoming event and a message reception event. The notification event may include, for example, a time alarm event, a schedule alarm event, and the like. These events are purely exemplary. It will be clearly understood to those skilled in the art that various events triggering display of information in the first area of the touch screen 140 and reception of a user gesture in the second area of the touch screen 140 can be implemented.

Further, for example, the controller 110 may identify the first area corresponding to the window area and the second area corresponding to the cover input area in a display screen of the touch screen 140, based on cover type information about the cover and may activate the first area as an information display area and the second area as a touch input area. Herein, a touch input may also be sensed in the first area.

Figure 9:
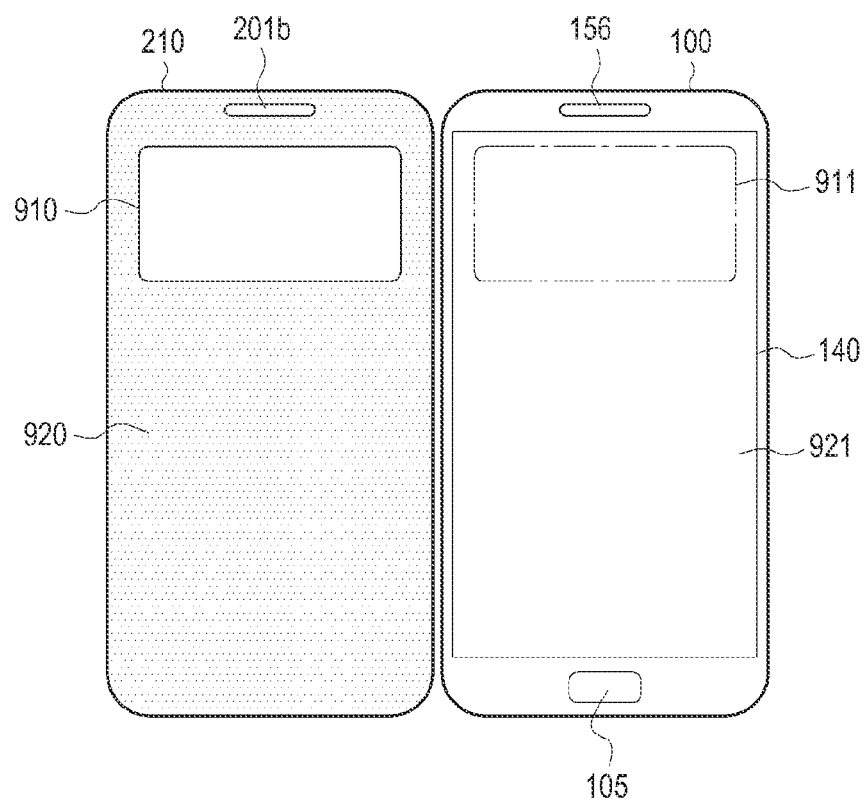
FIGS. 9, 10, 11, and 12 are diagrams illustrating touch screen areas defined for various types of covers, according to embodiments of the present invention.
Figure 10:
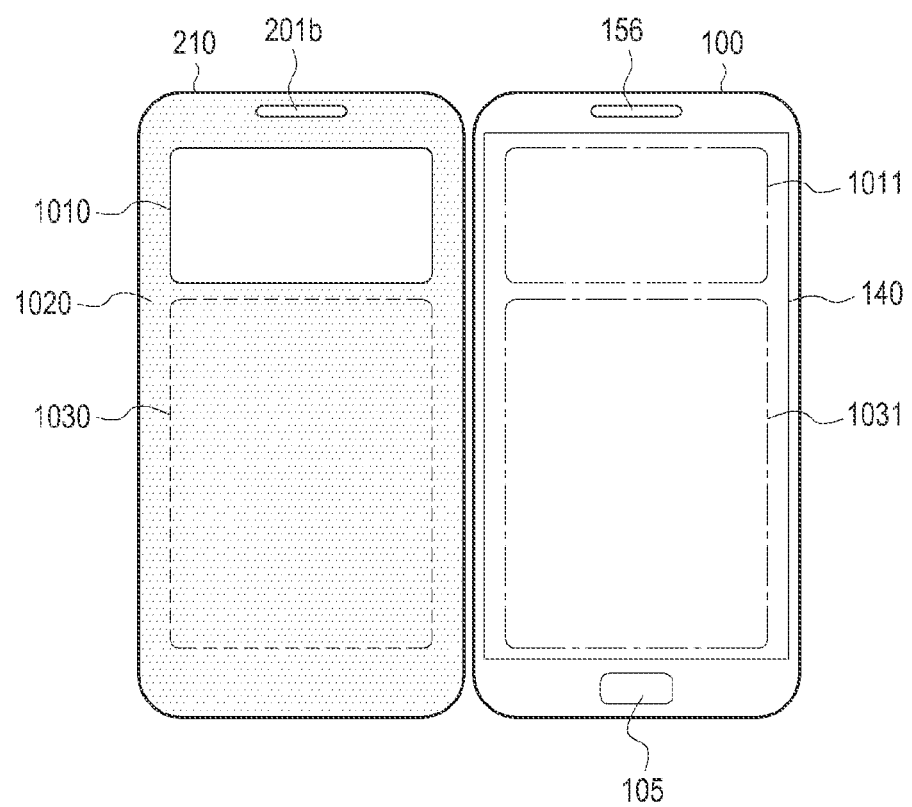
Figure 11:
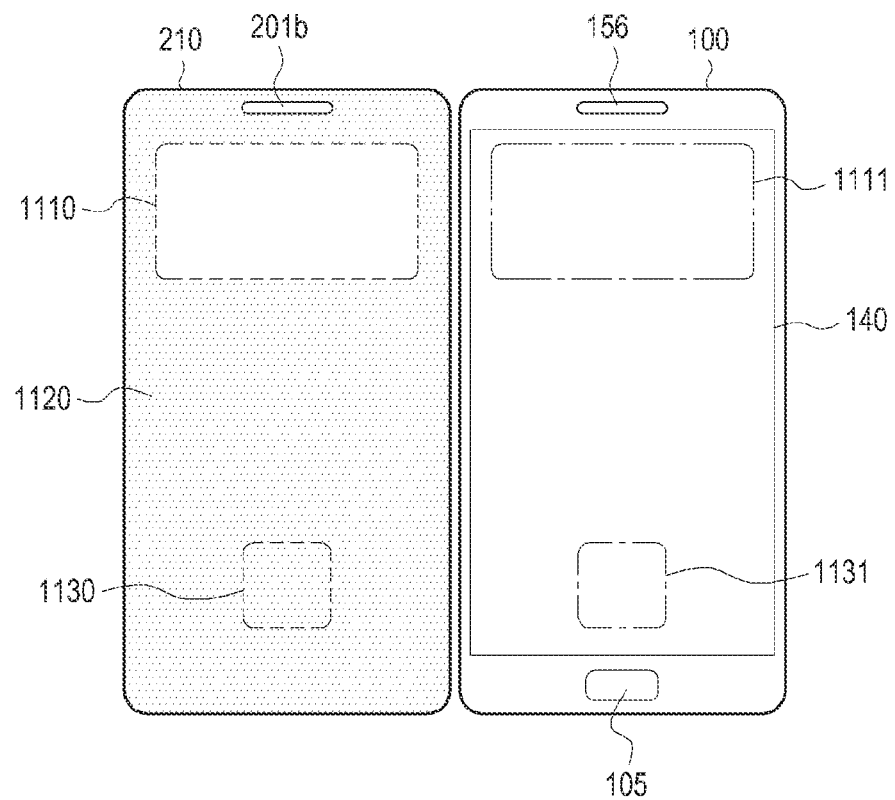

FIGS. 9, 10, and 11 are diagrams illustrating configurations of a touch screen area for various types of covers, according to embodiments of the present invention.

Referring to FIG. 9, a window area 910 is defined in an upper part of the front cover unit 210, the remaining area of the front cover unit 210 is defined as a non-window area 920, and the whole non-window area 920 is a cover input area in the cover 200, according to an embodiment of the present invention.

In this embodiment, the mobile terminal 100 activates a first area 911 corresponding to the window area 910 and a second area 921 corresponding to the non-window area 920, that is, the cover input area on a screen of the touch screen 140. Information may be displayed and a touch input may be sensed in the first area 911, whereas a touch input may be sensed but information may not be displayed in the second area 921.

Referring to FIG. 10, a window area 1010 is defined in an upper part of the front cover unit 210, the remaining area of the front cover unit 210 is defined as a non-window area 1020, and a cover input area 1030 is defined in a part of the non-window area 1020 under the window area 1010 in the cover 200, according to another embodiment of the present invention. In this embodiment, the mobile terminal 100 activates a first area 1011 corresponding to the window area 1010 and a second area 1031 corresponding to the cover input area 1030 on a screen of the touch screen 140. Information may be displayed in the first area 1011, whereas a touch input may be sensed in the second area 1031. A touch input may also be sensed in the first area 1011.

Referring to FIG. 11, a window area 1110 is defined in an upper part of the front cover unit 210, the remaining area of the front cover unit 210 is defined as a non-window area 1120, and a cover input area 1130 is defined in a part of the non-window area 1120 under the window area 1110 in the cover 200, according to another embodiment of the present invention. In this embodiment, the mobile terminal 100 activates a first area 1111 corresponding to the window area 1110 and a second area 1131 corresponding to the cover input area 1130 on a screen of the touch screen 140. Information may be displayed in the first area 1111, whereas a touch input may be sensed in the second area 1131. A touch input may also be sensed in the first area 1111.

Figure 12:
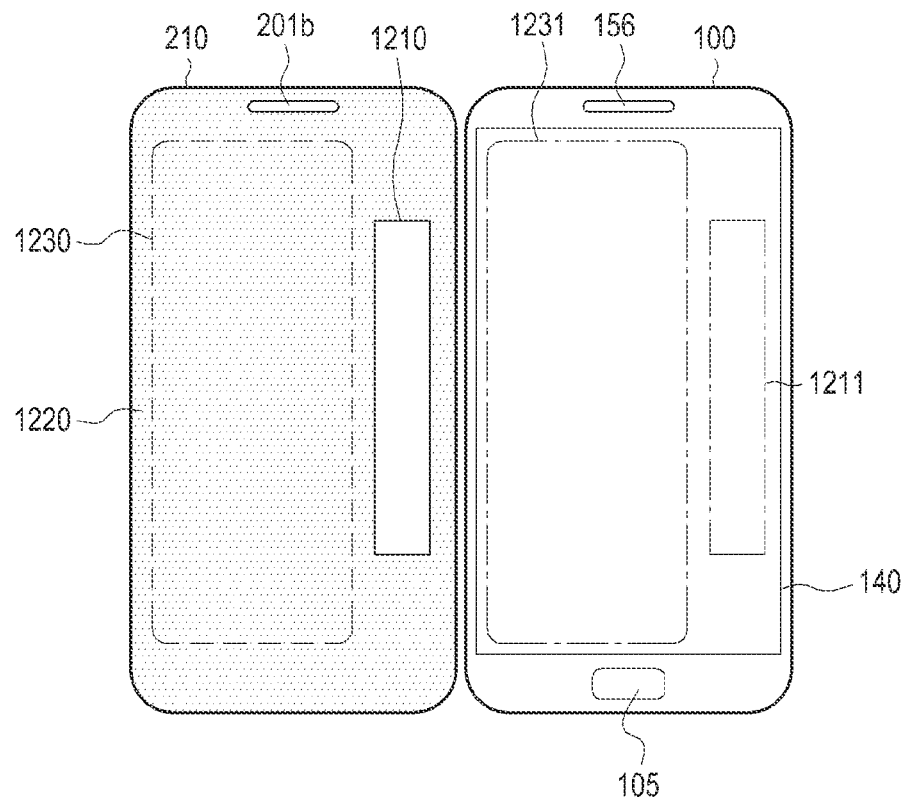

Referring to FIG. 12, a window area 1210 is defined in a right part of the front cover unit 210, the remaining area of the front cover unit 210 is defined as a non-window area 1220, and a cover input area 1230 is defined in a part of the non-window area 1220 to the left of the window area 1210 in the cover 200, according to another embodiment of the present invention. In this embodiment, the mobile terminal 100 activates a first area 1211 corresponding to the window area 1210 and a second area 1231 corresponding to the cover input area 1230 on a screen of the touch screen 140. Information may be displayed in the first area 1211, whereas a touch input may be sensed in the second area 1231. A touch input may also be sensed in the first area 1211.

Figure 13:
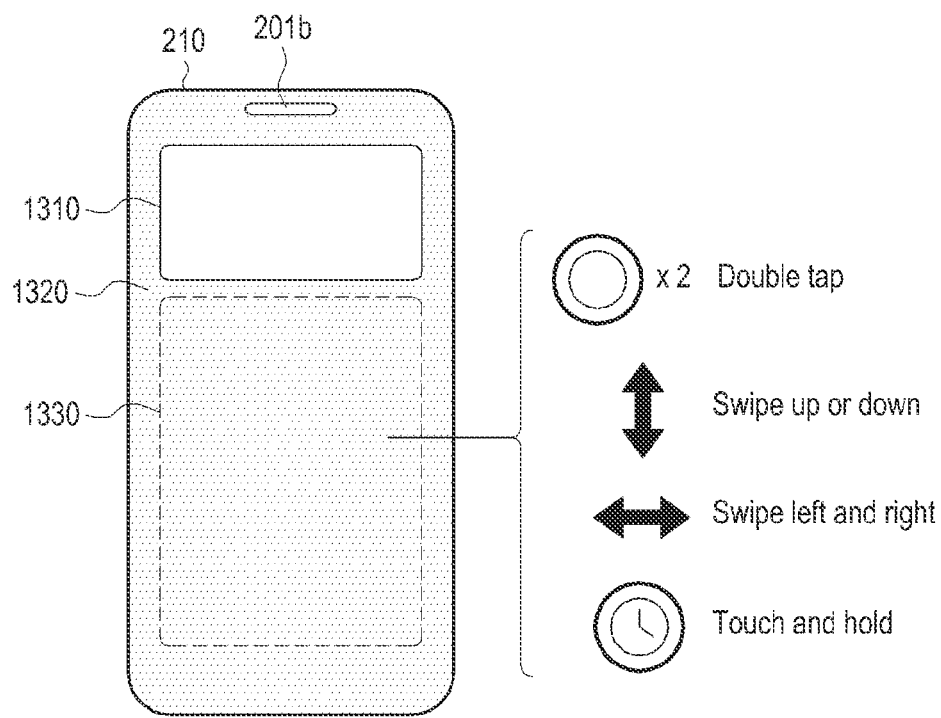
FIG. 13 is a diagram illustrating touch inputs, according to an embodiment of the present invention.

In an embodiment of the present invention, a touch input may be applied in various manners. FIG. 13 is a diagram illustrating touch inputs, according to embodiments of the present invention. Referring to FIG. 13, the touch inputs may include a double tap, a swipe-up or swipe-down, a left swipe or right swipe, a touch and hold, and the like. The touch inputs may further include many other types of touch inputs. The mobile terminal 100 may process a first-type touch input received from a cover input area 1330 of the cover 200 and detected in the second area of the touch screen 140 as a first command. The mobile terminal 100 may process a first-type touch input received from a window area 1310 and detected in the first area of the touch screen 140 as a second command. Further, the mobile terminal 100 may process a second-type touch input received from the window area 1310 of the cover 200 and detected in the first area of the touch screen 140 as a third command. The mobile terminal 100 may process a third-type touch input received from a non-window area 1320 of the cover 200 and detected in the second area of the touch screen 140 as a fourth command.

In various embodiments of the present invention, the first to fourth commands may be various control commands. For example, the first to fourth control commands may be a control command for controlling music play information, a control command for controlling a camera preview, a control command for controlling a call, and an application-related control command. In addition, the first to fourth control commands may be control commands related to other application programs.

Figure 14:
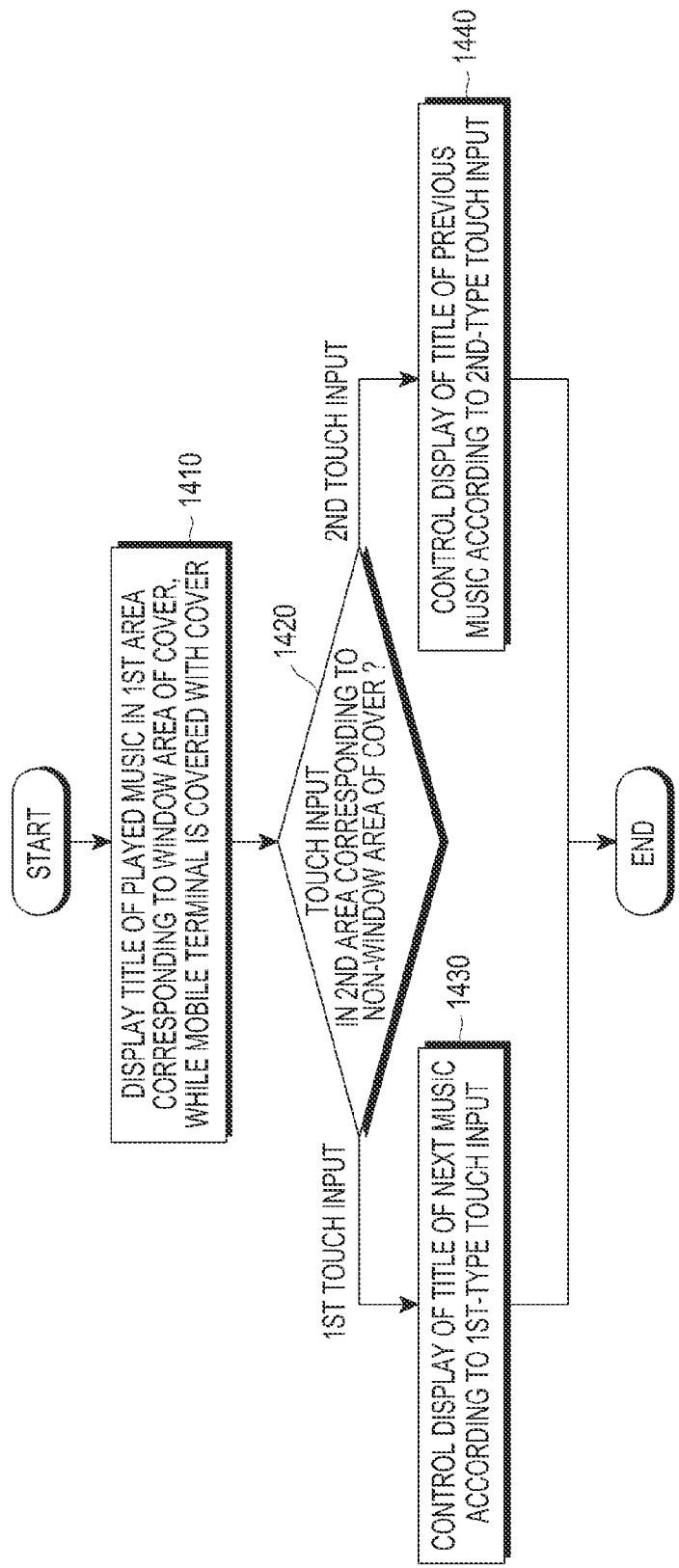
FIG. 14 is a flowchart illustrating an operation for controlling music play information using a first area and a second area defined on a touch screen in a mobile terminal, according to an embodiment of the present invention.
Figures 15A, 15B:
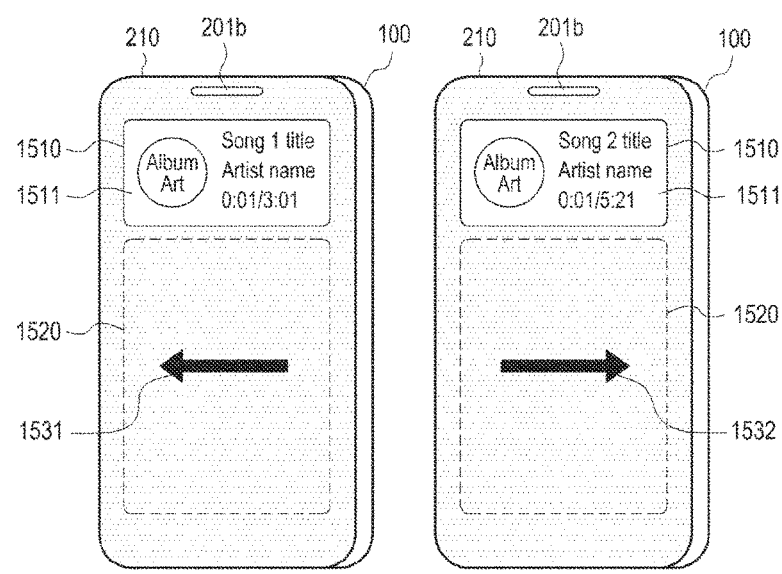
FIGS. 15A and 15B are diagrams illustrating screens for controlling music play information using a first area and a second area defined on a touch screen in a mobile terminal, according to an embodiment of the present invention.

FIG. 14 is a flowchart illustrating an operation for controlling music play information using a first area and a second area of the touch screen in the mobile terminal, according to an embodiment of the present invention. FIGS. 15A and 15B are diagrams illustrating screens for controlling music play information using the first area and the second area of the touch screen 140 in the mobile terminal 100, according to an embodiment of the present invention.

Referring to FIGS. 14, 15A, and 15B, being covered with the cover 200, the mobile terminal 100 displays music play information, for example, the title of played music, in a first area 1511 of the touch screen 140 corresponding to a window area 1510 of the cover 200, in step 1410.

In step 1420, the mobile terminal 100 determines whether a touch input has been applied to a second area 1520 of the touch screen 140 corresponding to a non-window area of the cover 200. For example, the mobile terminal 100 may determine whether a first-type touch input or a second-type touch input has been applied to the second area 1520 corresponding to the non-window area of the cover 200 or a cover input area defined in the non-window area of the cover 200.

Referring to FIG. 15A, the first-type touch input may be a swipe input in a first direction, for example, a left swipe 1531. Referring to FIG. 15B, the second-type touch input may be a swipe input in a second direction, for example, a right swipe 1532.

If the first-type touch input 1531 has been applied to the second area 1520, the mobile terminal 100 controls display of the title of the next music to be played according to the first-type touch input 1531, in step 1430. For example, upon input of the left swipe 1531 in the second area 1520 while the title of first music, 'Song 1 title' is displayed in the first area 1511, the mobile terminal 100 may control display of the title of second music, 'Song 2 title' in the first area 1511, as illustrated in FIG. 15B.

If the second-type touch input 1532 has been applied to the second area 1520, the mobile terminal 100 controls display of the title of the previous music according to the second-type touch input 1532, in step 1440. For example, upon input of the right swipe 1532 in the second area 1520 while the title of the second music, 'Song 2 title' is displayed in the first area 1511, as illustrated in FIG. 15B, the mobile terminal 100 may control display of the title of the first music, 'Song 1 title' in the first area 1511, as illustrated in FIG. 15A.

Figure 16:
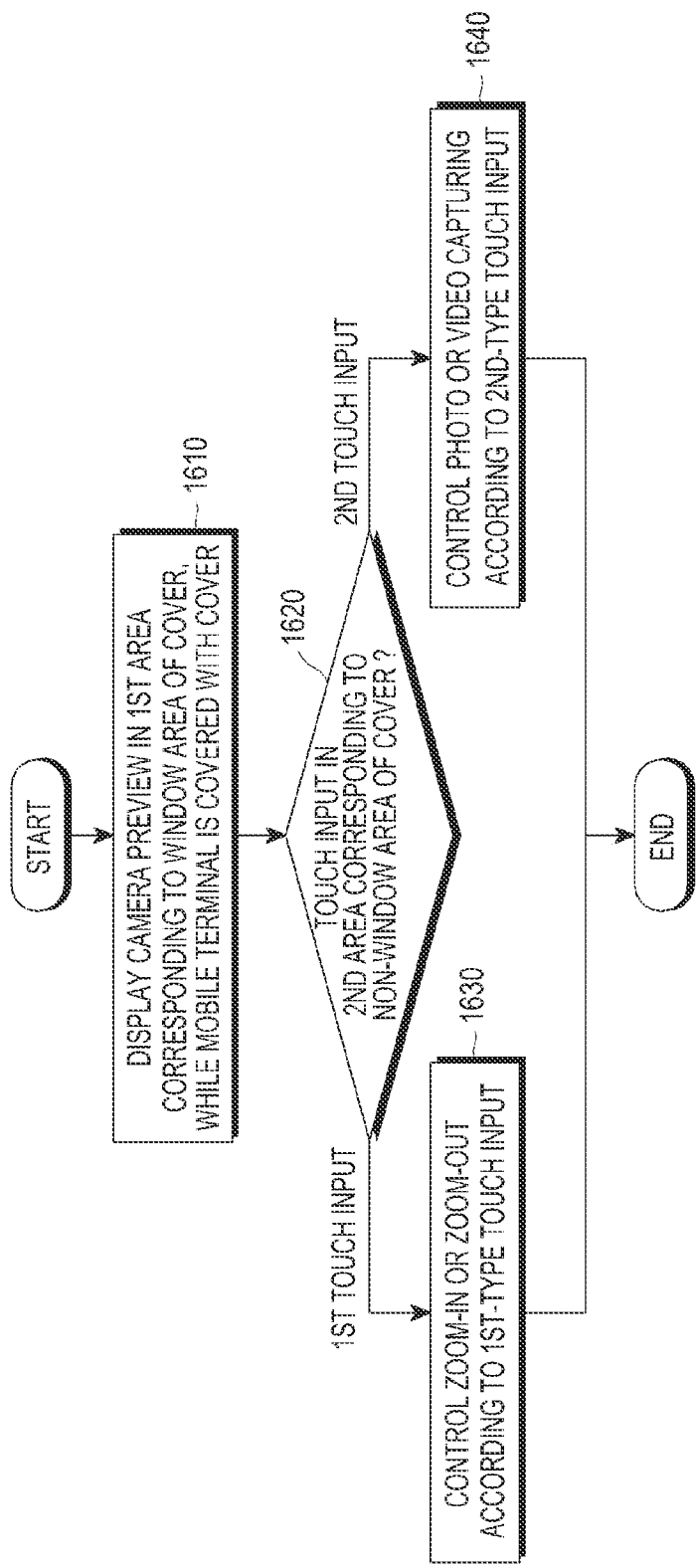
FIG. 16 is a flowchart illustrating an operation for controlling a camera preview using a first area and a second area defined on a touch screen in a mobile terminal, according to an embodiment of the present invention.
Figure 17:
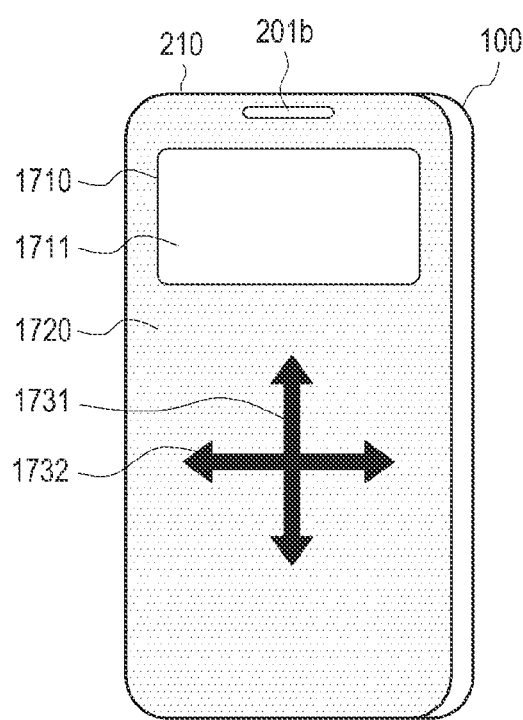
FIG. 17 is a diagram illustrating a screen for controlling a camera preview using a first area and a second area defined on a touch screen in a mobile terminal, according to an embodiment of the present invention.

FIG. 16 is a flowchart illustrating an operation for controlling a camera preview using a first area and a second area of the touch screen in the mobile terminal, according to an embodiment of the present invention. FIG. 17 is a diagram illustrating a screen for controlling a camera preview using the first area and the second area of the touch screen in the mobile terminal, according to an embodiment of the present invention.

Referring to FIGS. 16 and 17, being covered with the cover 200, the mobile terminal 100 displays a camera preview in a first area 1711 corresponding to a window area 1710 of the cover 200, in step 1610.

In step 1620, the mobile terminal 100 determines whether a touch input has been applied to a second area 1720 corresponding to a non-window area of the cover 200. For example, the mobile terminal 100 may determine whether a first-type touch input or a second-type touch input has been applied to the second area 1720 corresponding to the non-window area of the cover 200 or a cover input area defined in the non-window area of the cover 200.

Referring to FIG. 17, the first-type touch input may be a swipe input in a first or second direction, for example, a swipe-up or swipe-down 1731 and the second-type touch input may be a swipe input in a third or fourth direction, for example, a left or right swipe 1732.

If the first-type touch input 1731 has been applied to the second area 1720, the mobile terminal 100 controls zoom-in or zoom-out according to the first-type touch input 1531, in step 1630. For example, upon input of the swipe-up, the mobile terminal 100 may zoom in the camera preview and upon input of the swipe-down, the mobile terminal 100 may zoom out the camera preview.

If the second-type touch input 1732 has been applied to the second area 1720, the mobile terminal 100 controls photo capturing or video capturing according to the second-type touch input 1732, in step 1640. For example, upon input of a left swipe, the mobile terminal 100 may capture a photo and upon input of a right swipe, the mobile terminal 100 may capture a video.

Figure 18:
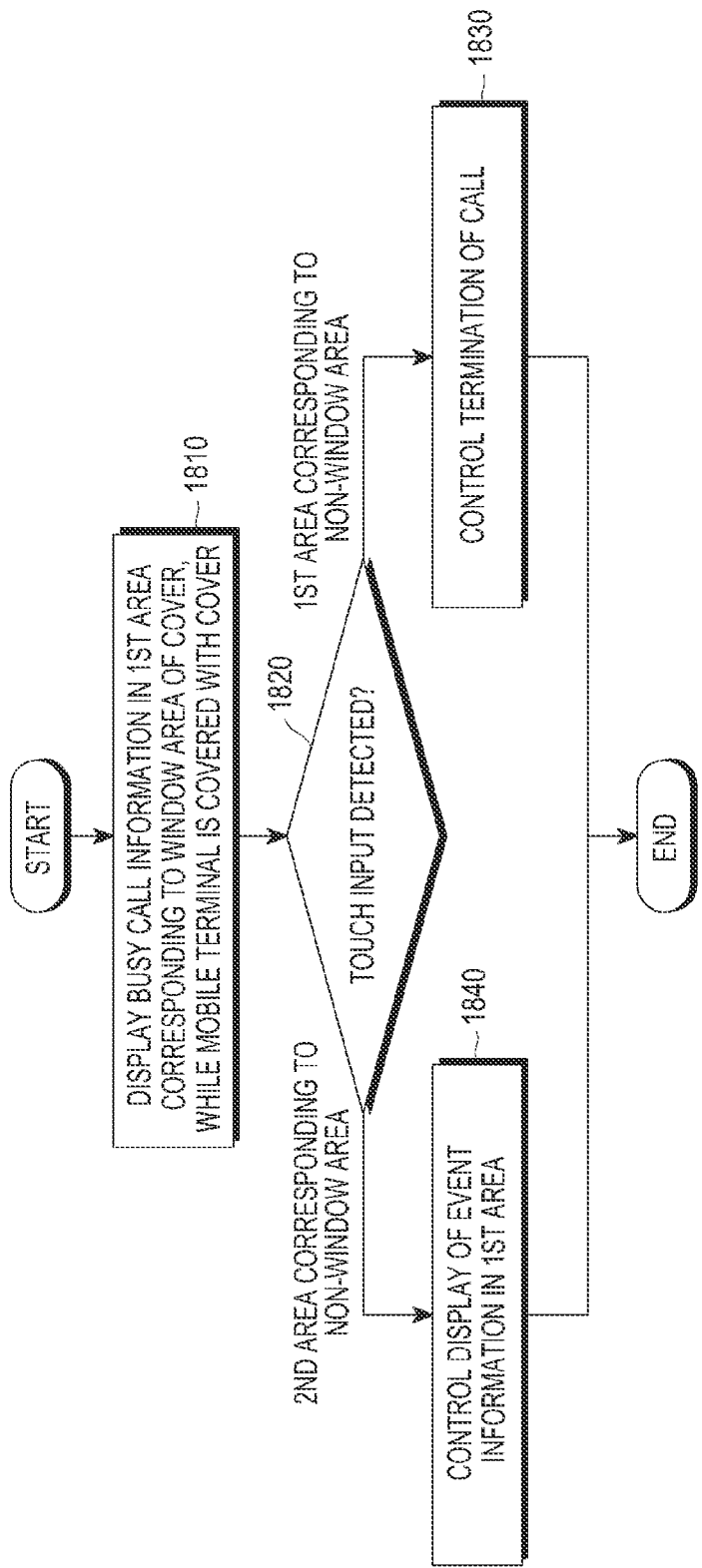
FIG. 18 is a flowchart illustrating an operation for controlling a busy call using a first area and a second area defined on a touch screen in a mobile terminal, according to an embodiment of the present invention.

FIG. 18 is a flowchart illustrating an operation for controlling a busy call using a first area and a second area of the touch screen in the mobile terminal, according to an embodiment of the present invention. FIGS. 19A, 19B, 20A, and 20B are diagrams illustrating screens for controlling a busy call using the first area and the second area of the touch screen 140 in the mobile terminal 100, according to an embodiment of the present invention.

Referring to FIGS. 18, 19A, 19B, 20A, and 20B, being covered with the cover 200, the mobile terminal 100 displays information indicating a busy call in a first area corresponding to a window area of the cover 200, in step 1810.

In step 1820, the mobile terminal 100 determines whether a touch input has been detected. For example, the mobile terminal 100 may detect a touch input received from a non-window area of the cover 200 or a cover input area defined in the non-window area of the cover 200 through a second area, and may detect a touch input received from the window area of the cover 200 through the first area.

Upon detection of a touch input in the first area corresponding to the window area, the mobile terminal 100 terminates the call, in step 1830. For example, upon detection of a left swipe 1931 in a first area 1911 displaying information indicating a busy call through window area

Figures 19A, 19B:
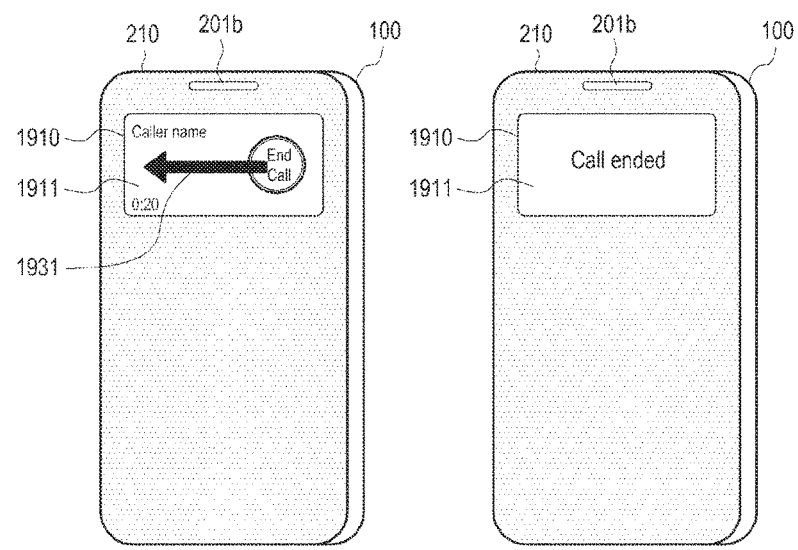
FIGS. 19A, 19B, 20A, and 20B are diagrams illustrating screens for controlling a busy call using a first area and a second area defined on a touch screen in a mobile terminal, according to an embodiment of the present invention.

1910, as illustrated in FIG. 19A, the mobile terminal 100 may end the call and display information indicating termination of the call, 'call ended' in the first area 1911, as illustrated in FIG. 19B.

Figures 20A, 20B:
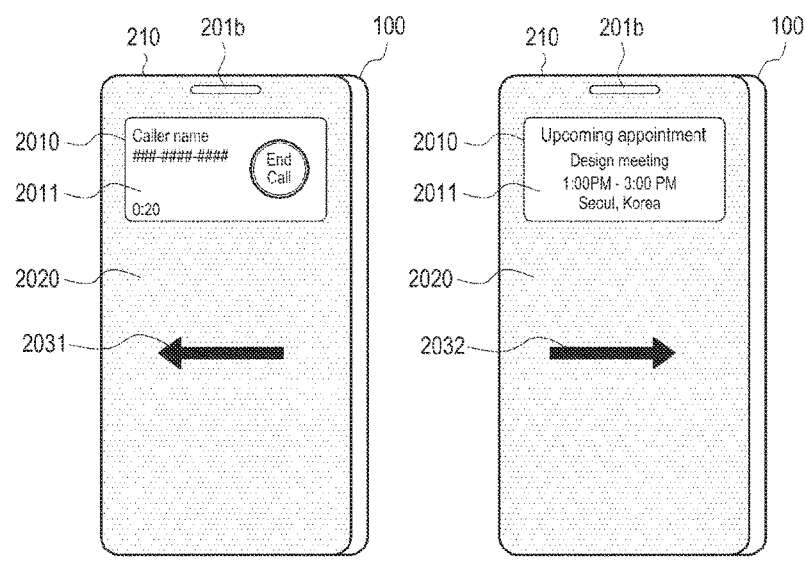

Upon detection of a touch input in the second area corresponding to the non-window area or the cover input area defined in the non-window area, the mobile terminal 100 controls display of event information in the first area, in step 1840. For example, upon detection of a left swipe 2031 in a second area 2020, as illustrated in FIG. 20A, the mobile terminal 100 may discontinue displaying the information indicating a busy call in a first area 2011 corresponding to a window area 2010, and may display predetermined event information in the first area 2011, as illustrated in FIG. 20B. The event information may be information about an appointment or a schedule. Upon detection of a right swipe 2032 in the second area 2020 while the predetermined event information is being displayed in the first area 2011, as illustrated in FIG. 20B, the mobile terminal 100 may display the information indicating a busy call in the first area 2011, as illustrated in FIG. 20A.

Figure 21:
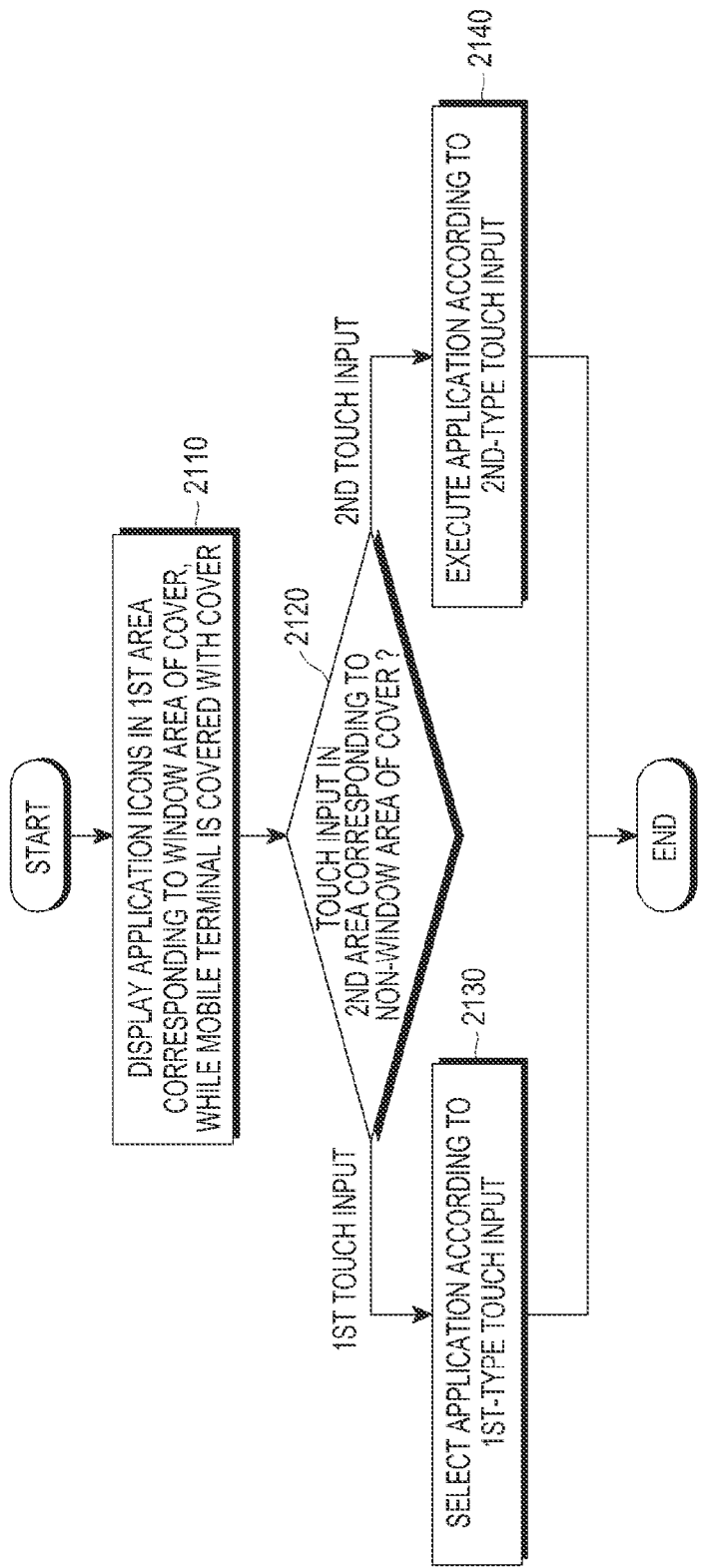
FIG. 21 is a flowchart illustrating an operation for controlling an application using a first area and a second area defined on a touch screen in a mobile terminal, according to an embodiment of the present invention.

FIG. 21 is a flowchart illustrating an operation for controlling an application using a first area and a second area defined on the touch screen in the mobile terminal, according to an embodiment of the present invention. FIGS. 22A, 22B, 23A, and 23B are diagrams illustrating screens for controlling an application using the first area and the second area defined on the touch screen in the mobile terminal, according to an embodiment of the present invention.

Referring to FIGS. 21, 22A, 22B, 23A, and 23B, being covered with the cover 200, the mobile terminal 100 displays information about at least one application in a first area corresponding to a window area of the cover 200, in step 2110. For example, the mobile terminal 100 may display at least one application icon in the first area.

In step 2120, the mobile terminal 100 determines whether a touch input has been applied to a second area corresponding to a non-window area of the cover 200. For example, the mobile terminal 100 may determine whether a first-type touch input or a second-type touch input has been applied to the second area corresponding to the non-window area of the cover 200 or a cover input area defined in the non-window area of the cover 200.

Referring to FIGS. 22A, 22B, 23A, and 23B, the first-type touch input may be a swipe input in a first or second direction, for example, a swipe-up 2232 or a swipe-down 2231, and the second-type touch input may be a swipe input in a third or fourth direction, for example, a left swipe 2331 or a right swipe 2332.

Figures 22A, 22B:
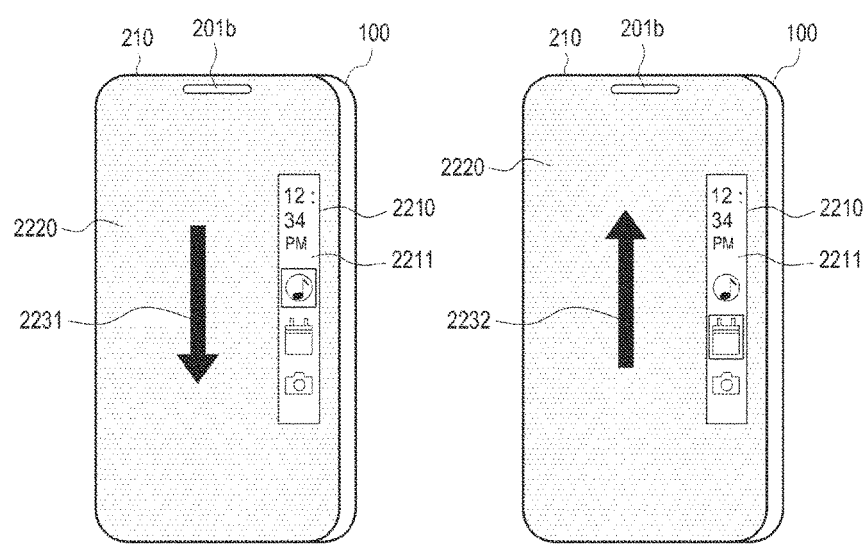
FIGS. 22A, 22B, 23A, and 23B are diagrams illustrating screens for controlling an application using a first area and a second area defined on a touch screen in a mobile terminal, according to an embodiment of the present invention.

Upon receipt of the first-type touch input in the second area, the mobile terminal 100 selects an application according to the first-type touch input, in step 2130. For example, the mobile terminal 100 may select one of the at least one application icon displayed in a first area 2211 through window area 2210, according to the swipe-down 2231 in a second area 2220, as illustrated in FIG. 22A, or the swipe-up 2232, as illustrated in FIG. 22B.

Figure 23A:
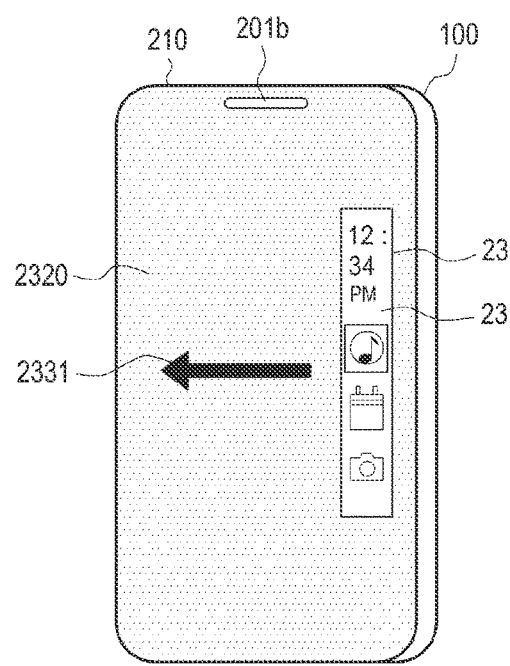
Figure 23B:
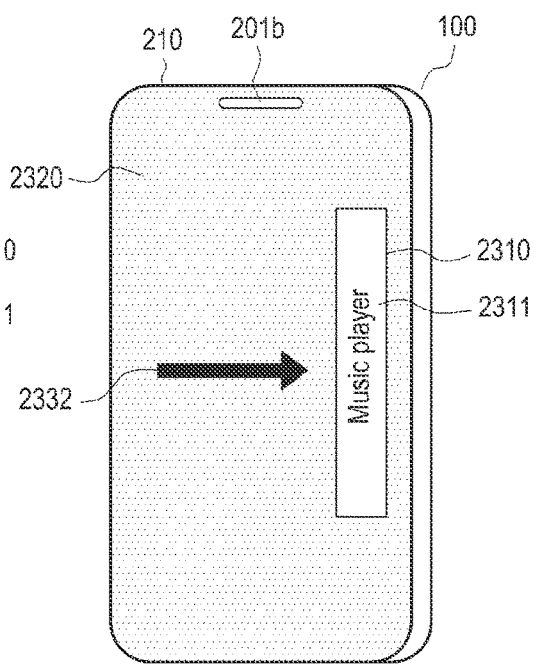

Upon receipt of the second-type touch input in the second area, the mobile terminal 100 executes an application according to the second-type touch input, in step 2140. For example, upon input of the left swipe 2331 on a second area 2320 while a music player is selected in a first area 2311 viewed through window area 2310, as illustrated in FIG. 23A, the mobile terminal 100 may execute the music player and display an execution screen of the music player in the first area 2311, as illustrated in FIG. 23B. Further, upon input of the right swipe 2332 while the execution screen of the music player is displayed in the first area 2311, as illustrated in FIG. 23B, the mobile terminal 100 may discontinue execution of the music player and display the at least one application icon again in the first area 2311, as illustrated in FIG. 23A.

In various embodiments of the present invention, since at least one window area is formed on the cover 200, even though the cover 200 covers the touch screen 140 of the mobile terminal 100, a user may conveniently view information displayed in a first area of the touch screen 140 corresponding to the window area, through the window area.

In various embodiments of the present invention, a touch input may be applied to a non-window area of the cover 200 or a cover input area defined in the non-window area of the cover 200 and the mobile terminal 100 may control display of information in the first area corresponding to the window area according to the touch input. Therefore, even when the cover 200 covers the mobile terminal 100, the user may conveniently control display of information in the mobile terminal 100.

In another embodiment of the present invention, a keypad may be formed on the cover 200. For example, a keypad may be formed in a cover input area defined in a non-window area of the front cover unit 210 in the cover 200. When a keypad is formed on the cover 200, the mobile terminal 100 may detect an input through the keypad 200.

FIGS. 24A, 24B, and 24C are diagrams illustrating a cover having a keypad formed on it, according to another embodiment of the present invention.

Referring to FIGS. 24A, 24B, and 24C, a front cover unit 2410 of a cover 2400 may be flipped open or closed as illustrated in FIG. 24A.

When the front cover unit 2410 of the cover 2400 is closed, a part (for example, a speaker) formed in the bezel 102 of the mobile terminal 100 may be exposed outwardly through an opening 2401b formed in the front cover unit 2410. While only one opening 240lb is shown in FIG. 24B, by way of example, a plurality of openings may be formed in the front cover unit 2410 so that when the front cover unit 2410 is closed, a plurality of parts (for example, a speaker, a camera, and the like) formed in the bezel 102 of the mobile terminal 100 may be exposed outwardly through the openings. As described above, when the front cover unit 2410 of the cover 2400 is closed, at least a part of the touch screen 140 of the mobile terminal 100 may be covered with the front cover unit 2410, as illustrated in FIG. 24B. Referring to FIG. 24B, when the front cover unit 2410 of the cover 2400 is closed, a part of the touch screen 140 corresponding to a window area 2401a may be exposed outward, while the remaining area of the touch screen 140 may not be exposed.

As shown in FIG. 24C, when the front cover unit 2410 is opened, the entire area of the touch screen 140 may be exposed outwardly in the mobile terminal 100.

Figure 25:
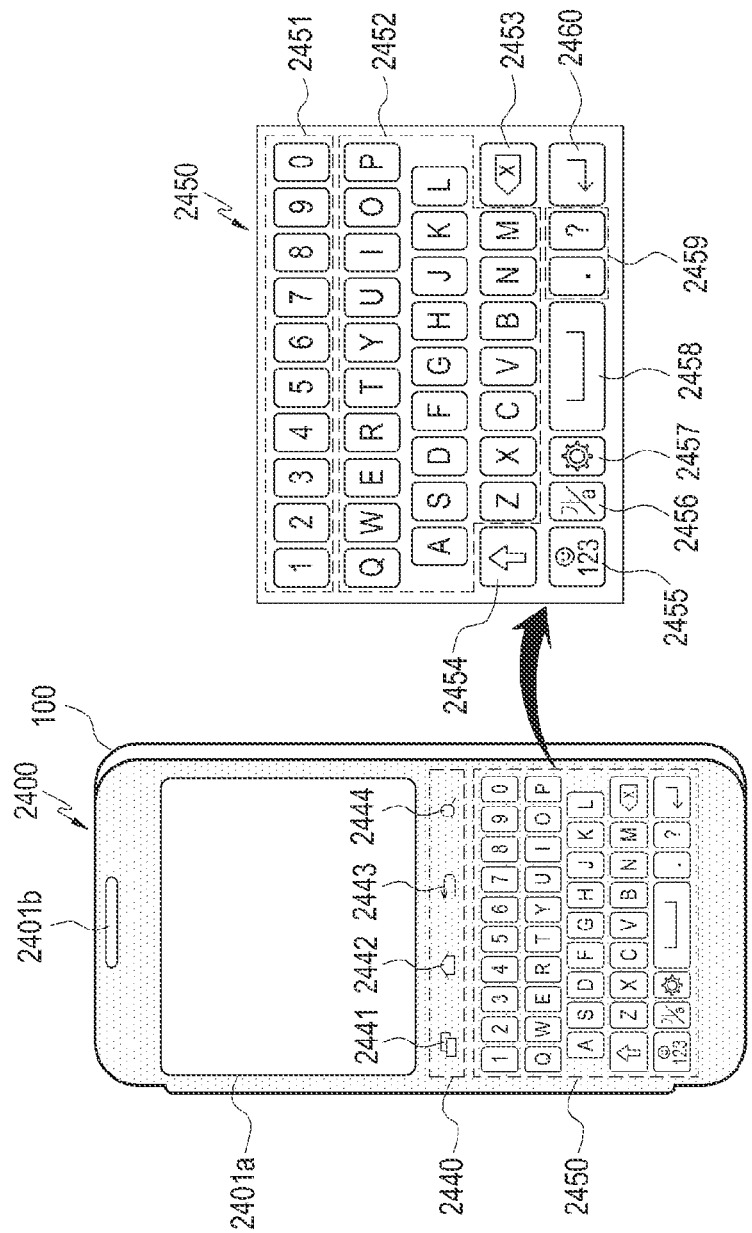
FIG. 25 is a diagram illustrating a keypad formed on a front cover unit, according to an embodiment of the present invention.

FIG. 25 is a diagram illustrating a keypad formed on the front cover unit 2410, according to an embodiment of the present invention. Referring to FIG. 25, a keypad 2450 is formed in a cover input area defined in the non-window area occupying the remaining area of the front cover unit 2410, except the window area 2401a and the opening 2401b. One or more buttons 2440 are formed along with the keypad 2450 in the cover input area.

The buttons 2440 are arranged under the window area 2401a. The buttons 2440 include a menu button 2441, a home button 2442, a back button 2443, and a search button 2444. The buttons 2440 may further include a recent button and other function buttons such as, for example, an Internet button, a camera button, and a messenger button. The buttons 2440 may include a button that executes the same function as a button (for example, the home button 105) formed in the bezel 102.

The keypad 2450 is disposed under the buttons 2440 and include a plurality of keys. The plurality of keys may include, for example, at least one numerical key 2451, at least one character key 2452, and at least one function key. The at least one function key includes a back space key 2453, a capital-lower case switch key 2454, a symbol-number switch key 2455, a Korean-English alphabet switch key 2456, a setting key 2457, a space key 2458, at least one punctuation mark key 2459, and an enter key 2460. The at least one function key may further include other function keys. The plurality of keys may be arranged in the QWERTY layout in the keypad 2450. In various embodiments of the present invention, the plurality of keys may be arranged in various layouts other than the QWERTY layout in the keypad 2450. Further, the plurality of keys may be arranged in the keypad 2450 in the same layout as a software keypad displayed on the touch screen 140 when the front cover unit 2410 is opened. Therefore, even when the front cover unit 2410 is closed, the user may use the keypad 2450 of the front cover unit 2410 conveniently, like using the software keypad.

The above-described buttons 2440 and the keypad 2450 may be formed on the outer surface of the front cover unit 2410. For example, each button or key of the buttons 2440 and the keypad 2450 may be engraved into or printed on the outer surface of the front cover unit 2410. In the case where each button or key of the buttons 2440 and the keypad 2450 is engraved into or printed on the outer surface of the front cover unit 2410, when a user's finger or a touch object like a stylus pen touches a key or a button, the mobile terminal 100 may sense the touch on the button or key on the surface of the front cover unit 2410. The mobile terminal 100 may detect a button input or a key input corresponding to the touch on the button or the key on the surface of the front cover unit 2410.

In another embodiment of the present invention, each button or key of the buttons 2440 and the keypad 2450 may include a manipulation protrusion and an operation protrusion.

FIGS. 26A, 26B, and 26C are diagrams illustrating keys formed on the front cover unit, according to an embodiment of the present invention. Referring to FIG. 26A, 26B, and 26C, each key of the keypad 2450 may be formed to include a manipulation protrusion and an operation protrusion.

For example, referring to FIG. 26A, each key (for example, a K key) 2452-1 of the keypad 2450 may include a manipulation protrusion 2610 and an operation protrusion 2620. The manipulation protrusion 2610 may be a protrusion manipulated by a manipulation object 2600 such as a user's finger or a stylus pen. The operation protrusion 2620 may be a protrusion operated upon manipulation of the manipulation protrusion 2610 by the manipulation object 2600 such as a user's finger or a stylus pen. For example, referring to FIG. 26B, the manipulation protrusion 2610 may have a contact surface and the manipulation object 2600 may press the contact surface of the manipulation protrusion 2610. As the manipulation protrusion 2610 is pressed, the operation protrusion 2620 may also be pressed. The operation protrusion 2620 may include an elastic body and may be spaced from the touch screen 140 by a predetermined distance. The elastic body may be pressed by the manipulation protrusion 2610 and then return to its original state. When the operation protrusion 2620 is pressed, the operation protrusion 2620 may contact the touch screen 140 as illustrated in FIG. 26C.

The user may apply an input, feeling a sense of physical pressure on a key having the manipulation protrusion 2610 and the operation protrusion 2620.

As the user presses the manipulation protrusion 2610, the mobile terminal 100 may sense the touch on the operation protrusion 2620 on the touch screen 140 and detect a button input or a key input corresponding to the touch on the operation protrusion 2620.

In an embodiment of the present invention, when the front cover unit 2410 is opened, the mobile terminal 100 may display a full screen on the touch screen 140. On the contrary, when the front cover unit 2410 is closed, the mobile terminal 100 may display a mini screen in the first area of the touch screen 140 corresponding to the window area 2401a. The full screen may refer to a screen displayed on the entirety of the touch screen 140 and the mini screen may refer to a scaled-down screen of the full screen. For example, the mini screen may be a scaled-down screen of a full locked screen displayed on the entirety of the touch screen 140, a scaled-down screen of a full home screen displayed on the entirety of the touch screen 140, or a scaled-down screen of a full application execution screen displayed on the entirety of the touch screen 140.

FIGS. 27A and 27B are diagrams illustrating a full screen and a mini screen, respectively, according to an embodiment of the present invention.

Referring to FIG. 27A, as the front cover unit 2410 is opened, a full screen is displayed on the touch screen 140. Referring to FIG. 27B, when the front cover unit 2410 is closed in the state illustrated in FIG. 27A, the full screen may be switched to a mini screen in the first area corresponding to the window area 2401a. On the contrary, with the mini screen displayed in the first area corresponding to the window area 2401a due to the closed front cover unit 2410 as illustrated in FIG. 27B, if the front cover unit 2410 is opened, the mini screen is switched to the full screen on the touch screen 140, as illustrated in FIG. 27A.

In an embodiment of the present invention, with the front cover unit 2410 closed on the mobile terminal 100, the mobile terminal 100 may display various types of mini screens in the first area of the touch screen 140 corresponding to the window area 2401a of the front cover unit 2410.

FIGS. 28A, 28B, 28C, 28D, and 28E are diagrams illustrating mini screens of first to fifth types, according to an embodiment of the present invention. Referring to FIGS. 28A, 28B, 28C, 28D, and 28E, if with the front cover unit 2410 closed, the mobile terminal 100 is placed in a normal mode, the mobile terminal 100 displays the mini screens of the first to fifth types.

Figure 28A:
FIGS. 28A, 28B, 28C, 28D, and 28E are diagrams illustrating mini screens of $1^{st}$ to $5^{th}$ types, respectively, according to an embodiment of the present invention.
Figure 28D:
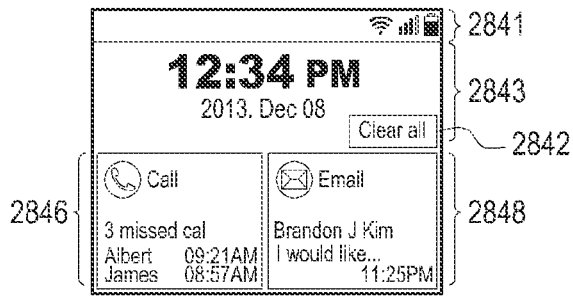
Figure 28B:
Figure 28E:
Figure 28C:

Referring to FIG. 28A, the first-type mini screen includes a status bar 2811 and a time information area 2813. Referring to FIG. 28B, the second-type mini screen includes a status bar 2821, a time information area 2823, and a weather information area 2825. Referring to FIG. 28C, the third-type mini screen includes a status bar 2831, a time information area 2833, and a calendar information area 2837. Referring to FIG. 28D, the fourth-type mini screen includes a status bar 2841, a notification area 2842, a time information area 2843, a call information area 2846, and an e-mail information area 2848. Referring to FIG. 28E, the fifth-type mini screen includes a status bar 2851, a time information area 2853, and a mini application area 2859. The mini application area 2859 may be a mini music application area that displays information about execution of a music play application and allows the user to control the music play application during execution of the music play application. A mini application area for a function other than the music play application may be included in the mini screen.

FIGS. 29A, 29B, 29C, 29D, and 29E are diagrams illustrating mini screens of sixth to tenth types, according to an embodiment of the present invention.

Referring to FIGS. 29A, 29B, 29C, 29D, and 29E, if with the front cover unit 2410 closed, the mobile terminal 100 is placed in a locking mode, the mobile terminal 100 may display the mini screens of the sixth to tenth types.

Figure 29A:
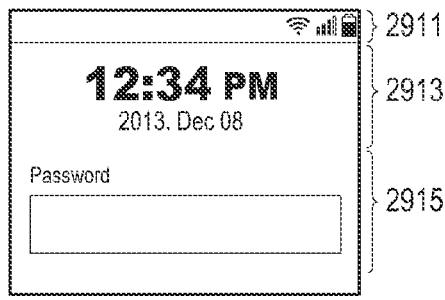
FIGS. 29A, 29B, 29C, 29D, and 29E are diagrams illustrating mini screens of $6^{th}$ to $10^{th}$ types, according to an embodiment of the present invention.
Figure 29B:
Figure 29C:
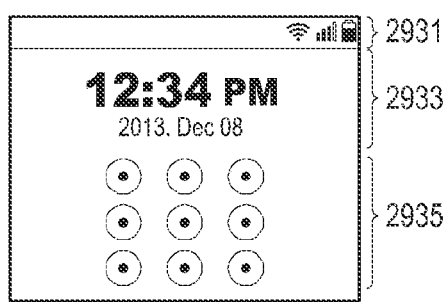
Figure 29D:
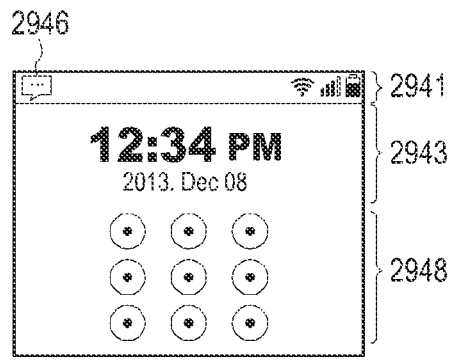
Figure 29E:
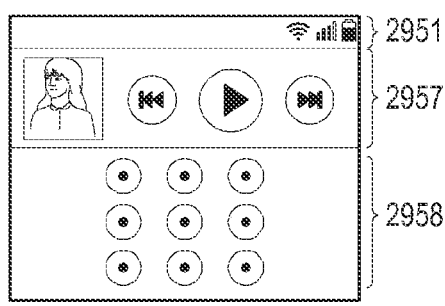

Referring to FIG. 29A, the sixth-type mini screen includes a status bar 2911, a time information area 2913, and a password input area 2915. Upon receipt of a password in the password input area 2915, the mobile terminal 100 may switch from the locking mode to the normal mode. Referring to FIG. 29B, the seventh-type mini screen includes a status bar 2921, a time information area 2923, and a Personal Identification Number (PIN) input area 2925. Upon receipt of a PIN in the PIN input area 2925, the mobile terminal 100 may switch from the locking mode to the normal mode. Referring to FIG. 29C, the eighth-type mini screen includes a status bar 2931, a time information area 2933, and an unlocking pattern input area 2935. Upon receipt of an unlocking pattern in the unlocking pattern input area 2935, the mobile terminal 100 switches from the locking mode to the normal mode. Referring to FIG. 29D, the ninth-type mini screen includes a status bar 2941, a time information area 2943, an unlocking pattern input area 2948, and a notification icon 2946. The notification icon 2946 may indicate the presence of a notification from an application. Referring to FIG. 29E, the tenth-type mini screen includes a status bar 2951, a mini application area 2957, and an unlocking pattern input area 2958. The mini application area 2957 may be a mini music application area that displays information about execution of a music play application and allows the user to control the music play application during execution of the music play application. A mini application area of a function other than the music play application may be included in the mini screen.

Figure 30A:
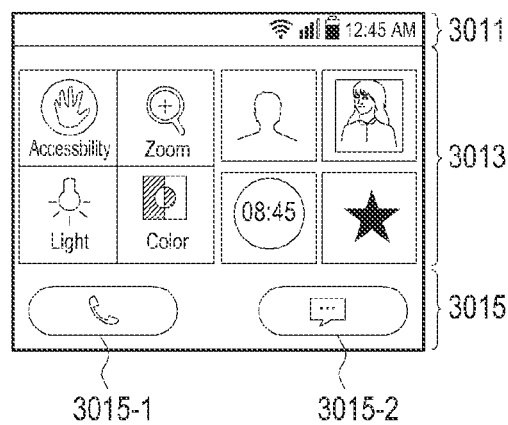
FIGS. 30A and 30B are diagrams illustrating mini screens of $11^{th}$ and $12^{th}$ types, according to an embodiment of the present invention.
Figure 30B:
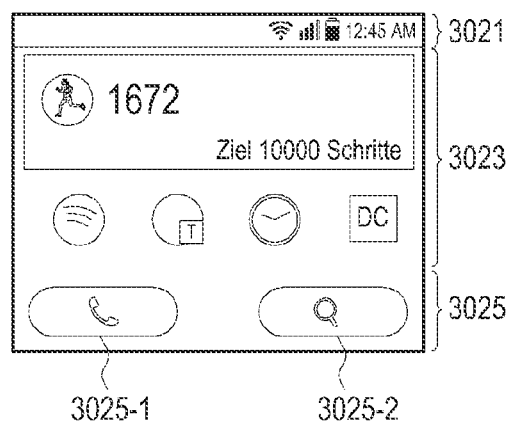

FIGS. 30A and 30B are diagrams illustrating mini screens of eleventh and twelfth types according to an embodiment of the present invention. Referring to FIGS. 30A and 30B, with the front cover unit 2410 closed, the mobile terminal 100 displays the mini screens of the eleventh and twelfth types.

Referring to FIG. 30A, the eleventh-type mini screen includes a status bar 3011, a mini home area 3013, and a shortcut icon area 3015. The mini home area 3013 is a scaled-down screen of a home screen and may display shortcut images representing applications displayed on the home screen. Upon selection of a shortcut image, an application corresponding to the selected shortcut image may be executed. One or more shortcut icons may be displayed in the shortcut icon area 3015. The shortcut icons include a call application icon 3015-1 and a message application icon 3015-2. Upon selection of a shortcut icon, an application corresponding to the shortcut icon may be executed. The shortcut icons may be replaced with other shortcut icons in the eleventh-type mini screen.

For example, referring to FIG. 30B, the twelfth-type mini screen includes a status bar 3021, a mini home area 3023, and a shortcut icon area 3025, and may be configured by changing at least one of the shortcut icons displayed in the eleventh-type mini screen. For example, the message application icon 3015-2 may be replaced with a search icon 3025-2 in the twelfth-type mini screen.

Figure 31:
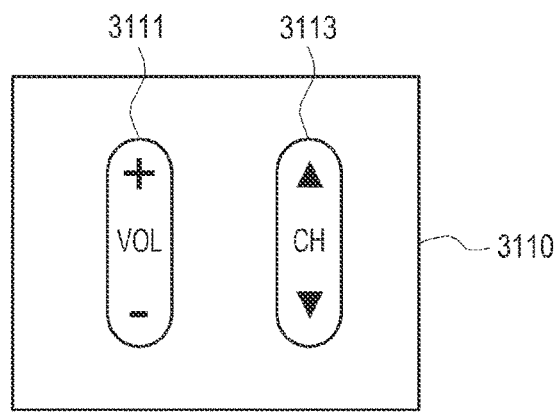
FIG. 31 is a diagram illustrating a mini screen of a $13^{th}$ type, according to an embodiment of the present invention.

FIG. 31 is a diagram illustrating a thirteenth-type mini screen, according to an embodiment of the present invention. Referring to FIG. 31, with the front cover unit 2410 closed, the mobile terminal 100 displays the thirteenth-type mini screen representing important functions that require a fast user's access to the first area corresponding to the window area 2401a. For example, the thirteenth-type mini screen may be a remote control mini screen 3110. The remote control mini screen 3110 may include a volume control button 3111 and a channel control button 3113. The volume control button 3111 may be used to control sound volume and the channel control button 3113 may be used to switch channels.

In an embodiment of the present invention, the mobile terminal 100 may control display of a mini screen according to a touch input on the mini screen displayed in the first area of the touch screen 140.

Figures 32A, 32B:
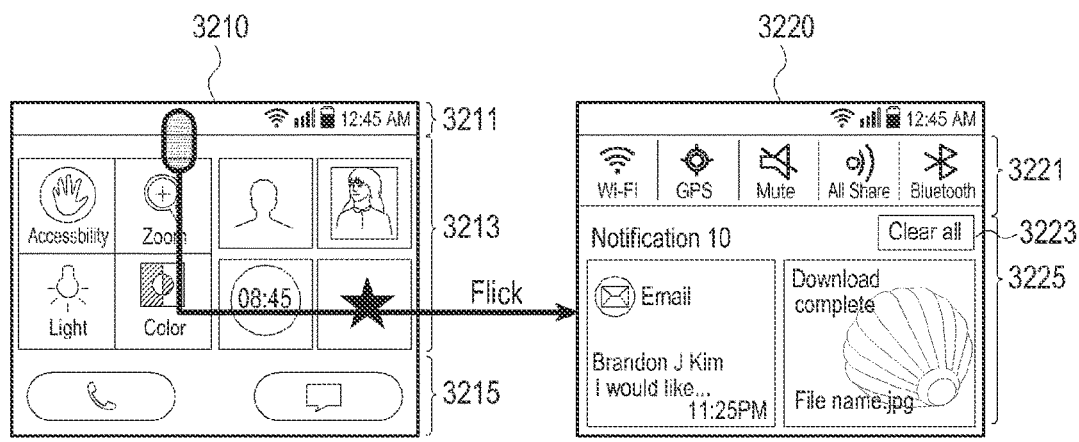
FIGS. 32A and 32B are diagrams illustrating a method for controlling display of a mini screen, according to an embodiment of the present invention.

FIGS. 32A and 32B are diagrams illustrating a method for controlling display of a mini screen, according to an embodiment of the present invention.

Referring to FIGS. 32A and 32B, upon receipt of a touch input, for example, a flick input in a status bar area 3211 on a home mini screen 3210, which also includes a mini home area 3213 and a shortcut icon area 3215, as illustrated in FIG. 32A, the mobile terminal 100 may control display of a notification mini screen 3220 corresponding to a notification panel, as illustrated in FIG. 32B. The notification mini screen 3220 includes at least one shortcut setting button 3221, notification information 3223, and at least one mini application area 3225. The at least one shortcut setting button 3221 may include a Wi-Fi setting button, a GPS setting button, a Mute setting button, an All share setting button, and a Bluetooth setting button. The notification information 3223 may include notification information from various applications. The at least one mini application area 3225 may include, for example, a mini e-mail application area that enables control of an e-mail application or a mini download application area that enables control of a download application. The at least one mini application area 3225 may include a mini application area of a function or application other than the e-mail application and the download application.

In various embodiments of the present invention, upon sensing at least one key input through the keypad 2450 of the front cover unit 2410, the mobile terminal 100 may receive text corresponding to the at least one key input.

FIGS. 33A, 33B, 33C, 34A, 34B, 34C, 34D, and 34E are diagrams illustrating operations performed in regard to text inputs through the keypad of the front cover unit in the mobile terminal, according to an embodiment of the present invention.

Referring to FIGS. 33A, 33B, and 33C, the mobile terminal 100 displays a time mini screen 3310 in the first area of the touch screen 140 corresponding to the window area 2401a of the front cover unit 2410, as illustrated in FIG. 33A. In addition, the mobile terminal 100 displays a home mini screen 3320 in the first area of the touch screen 140 corresponding to the window area 2401a of the front cover unit 2410, as illustrated in FIG. 33B. Upon sensing at least one key input through the keypad 2450 of the front cover unit 2410 while the mini screen 3310 or 3320 is displayed, the mobile terminal 100 may perform a search operation using text corresponding to the at least one key input. If text 'samsun' is received as indicated by reference numeral 3301, the mobile terminal 100 searches using 'samsun' as a search keyword and displays a search result mini screen 3330 showing search results, as illustrated in FIG. 33C. For example, the search result mini screen 3330 may provide search results based on the keyword 'samsun', including detected applications and e-mails.

Referring to FIGS. 34A, 34B, 34C, 34D, and 34E, the mobile terminal 100 displays a search mini screen 3410 for a search operation in the first area of the touch screen 140 corresponding to the window area 2401a of the front cover unit 2410. Upon sensing at least one key input through the keypad 2450 of the front cover unit 2410 while the search mini screen 3410 is displayed, the mobile terminal 100 performs a search operation using text corresponding to the at least one key input. When text 'samsun' is input on the search mini screen 3410 as indicated by reference numeral 3415, the mobile terminal 100 searches for the text 'samsun' in information stored in the mobile terminal 100 and displays a search result mini screen 3420, as illustrated in FIG. 33B. For example, the mobile terminal 100 may display the search result mini screen 3420 indicating applications and e-mails detected by the search operation using the text, 'samsun'. The search result mini screen 3420 includes a search field 3421 and a search result area 3422. The input text, for example, 'samsun' may be displayed in the search field 3421 and search results may be displayed in the search result area 3422. The search result area 3422 may be scrolled according to a user input. For example, the search results may be scrolled up in the search result area 3422 according to a scroll up input 3431 made from the bottom of the search result area 3422, as illustrated in FIG. 34B. Further, upon receipt of a scroll down input 3433 made from the top of a search result area 3432, as illustrated in FIG. 34C, the search results may be scrolled down in the search result area 3422, as illustrated in FIG. 34B.

Upon input of the text 'samsun' through the keypad 2450 in the search mini screen 3410 as indicated by reference numeral 3415, as illustrated in FIG. 34A, a search application may be executed and a search application mini screen 3440 may be displayed, as illustrated in FIG. 34D. For example, the search application mini screen 3440 may include a search field 3441 and a search application area 3442. The input text, for example, 'samsun' may be displayed in the search field 3441 and a Web search application may be displayed in the search application area 3442.

If text 'g.com' is added to the text 'samsun' and the final input text is 'samsung.com', the mobile terminal 100 may display a Uniform Resource Locator (URL) mini screen 3450, determining that the text type of samsung.com is a URL, as shown in FIG. 34E. The URL mini screen 3450 may include a URL field 3451, a URL execution icon 3452, and a search icon 3453. The input text, for example, a URL such as 'samsung.com' may be displayed in the URL field 3451. The URL execution icon 3452 may be used to invoke a Web page corresponding to the URL displayed in the URL field 3451. The search icon 3453 may be used for a search.

In various embodiments of the present invention, the mobile terminal 100 may determine the type of a text input through the keypad 2450 of the front cover unit 2410 and may display an application mini screen corresponding to the text type.

FIGS. 35A, 35B, 35C, 35D, and 35E are diagrams illustrating operations performed according to the types of text inputs through the keypad of the front cover unit in the mobile terminal, according to an embodiment of the present invention.

Referring to FIGS. 35A, 35B, 35C, 35D, and 35E, the mobile terminal 100 displays a search mini screen 3510 for a search operation in the first area of the touch screen 140 corresponding to the window area 2401a of the front cover unit 2410, as illustrated in FIG. 35A. A home mini screen may be displayed. Upon sensing at least one key input through the keypad 2450 of the front cover unit 2410 while the search mini screen 3510, the home mini screen, or a predetermined other mini screen is displayed, the mobile terminal 100 receives text 3501 corresponding to the at least one key input. The mobile terminal 100 determines the type of the received text 3501. For example, the mobile terminal 100 may determine whether the received text is a phone number, an e-mail, a URL, or long text. If the received text is a phone number, the mobile terminal 100 displays a call mini screen 3520, as illustrated in FIG. 35B. The call mini screen 3520 includes a phone number field 3521, a message icon 3524, a call icon 3526, and a phone number add icon 3528. The input text, for example, a phone number such as 012-3456-7890 may be displayed in the phone number field 3521. The message icon 3524 may be used to send a message to the phone number. The call icon 3526 may be used to dial the phone number. The phone number add icon 3528 may be used to add a phone number to the phone number field 3521.

If the received text is an e-mail, the mobile terminal 100 displays an e-mail mini screen 3530, as illustrated in FIG. 35C. The e-mail mini screen 3530 includes an e-mail address field 3531, an e-mail icon 3534, and an e-mail address add icon 3536. The input text, for example, an e-mail address such as tizen@samsung.com may be displayed in the e-mail address field 3531. The e-mail address add icon 3536 may be used to add an e-mail address to the e-mail address field 3531.

If the input text is a URL, the mobile terminal 100 displays a URL mini screen 3540, as illustrated in FIG. 35D. The URL mini screen 3540 includes a URL field 3541, a URL icon 3544, and a search icon 3546. The input text, for example, a URL such as 'samsung.com' may be displayed in the URL field 3541. The URL icon 3544 may be used to invoke a Web page corresponding to the URL displayed in the URL field 3441. The search icon 3546 may be used to perform a search operation.

If the input text is long text, the mobile terminal 100 displays a Social Networking Service (SNS) mini screen 3550 as illustrated in FIG. 35E. The SNS mini screen 3550 includes a long text field 3551, a first SNS icon 3554, a second SNS icon 3556, and a memo icon 3558. The input text, for example, long text may be displayed in the long text field 3551. The second SNS icon 3556 may be, for example, a Twitter icon. The memo icon 3558 may be used to write long text. As described above, the mobile terminal 100 may display the SNS mini screen 3550 according to a text input in the home mini screen or the search mini screen 3510 and may display the input text on the SNS mini screen 3550. In another embodiment of the present invention, even though text is not input, the mobile terminal 100 may automatically display the SNS mini screen 3550 according to a pop notification and text may be input while the SNS mini screen 3550 is displayed.

In various embodiments of the present invention, with the front cover unit 2410 closed, the mobile terminal 100 may perform various functions according to an input on a mini screen or an input from the keypad 2450 of the front cover unit 2410. For example, the mobile terminal 100 may recognize text input through the keypad 2450 of the front cover unit 2410 as a command and thus may perform a function according to the command. Herein, the keypad 2450 is a UI through which information is exchanged between the user and the mobile terminal 100 and serves as a Command Line Interface (CLI).

FIGS. 36A, 36B, 36C, 36D, and 36E are diagrams illustrating an operation for performing a call function, upon receipt of an input through a mini screen or through a keypad of the front cover unit, with a front cover unit closed in a mobile terminal, according to an embodiment of the present invention.

Referring to FIGS. 36A, 36B, 36C, 36D, and 36E, with the front cover unit 2410 having the window area 2401a, the buttons 2440, and the keypad 2450 closed, the mobile terminal 100 displays a home mini screen 3610 in the first area of the touch screen 140 corresponding to the window area 2401a. The home mini screen 3610 includes a call application icon 3611 and a message application icon 3613.

Upon receipt of a tap input on the call application icon 3611 displayed on the home mini screen 3610 as illustrated in FIG. 36A, the mobile terminal 100 displays a call mini screen 3620, and a message button 3524, a call button 3526, and a contact button 3528 are displayed on the call mini screen 3620 as illustrated in FIG. 36B. Upon receipt of a phone number through the keypad 2450 of the front cover unit 2410 while the call mini screen 3620 is displayed, as illustrated in FIG. 36B, the mobile terminal 100 displays a call mini screen 3650 to which the phone number has been input, as illustrated in FIG. 36E.

Upon receipt of a tap and hold input on the call application icon 3611 in the home mini screen 3610, as illustrated in FIG. 36A, the mobile terminal 100 displays a call record mini screen 3630, as illustrated in FIG. 36C.

Upon selection of a call record in the call record mini screen 3630, as illustrated in FIG. 36C, the mobile terminal 100 displays the call mini screen 3650 with a phone number corresponding to the selected call record, as illustrated in FIG. 36E.

Upon receipt of text through the keypad 2450 of the front cover unit 2410 while the home mini screen 3610 is displayed, as illustrated in FIG. 36A, the mobile terminal 100 searches for a phone number corresponding to the received text in a phonebook and displays a search mini screen 3640, as illustrated in FIG. 36D. Upon selection of a phone number from among search results on the phone number search mini screen 3640 as illustrated in FIG. 36D, the mobile terminal 100 displays the call mini screen 3650 with the selected phone number, as illustrated in FIG. 36E.

Upon input of a phone number through the keypad 2450 of the front cover unit 2410 while the home mini screen 3610 is displayed, as illustrated in FIG. 36A, the mobile terminal 100 receives the phone number and displays the call mini screen 3650 with the phone number, as illustrated in FIG. 36E.

Upon input of a call button 3652 on the call mini screen 3650 with a phone number as illustrated in FIG. 36E, the mobile terminal 100 may dial the phone number.

FIGS. 37A, 37B, and 37C are diagrams illustrating an operation for performing a message function according to an input on a mini screen or an input through the keypad of the front cover unit, with the front cover unit 2410 closed, according to an embodiment of the present invention.

Referring to FIGS. 37A, 37B, and 37C, upon receipt of a tap input on a message application icon 3713 displayed on a home mini screen 3710, which also includes a call application icon 3711, as illustrated in FIG. 37A, the mobile terminal 100 displays a message list mini screen 3720, as illustrated in FIG. 37B. The message list mini screen 3720 includes a dialogue list 3721. Upon selection of a dialogue from the dialogue list 3721 on the message mini screen 3720, as illustrated in FIG. 7B, the mobile terminal 100 displays a dialogue mini screen 3730, as illustrated in FIG. 37C. The dialogue mini screen 3730 includes a dialogue 3731. Upon receipt of a tap and hold input on the message application icon 3713 in the home mini screen 3710, as illustrated in FIG. 37A, the mobile terminal 100 displays the dialogue mini screen 3730, as illustrated in FIG. 37C.

FIGS. 38A, 38B, 38C, 38D, 38E, 38F, and 38G are diagrams illustrating operations for performing various application functions, upon selection of applications on a mini screen, with the front cover unit closed, according to an embodiment of the present invention.

Referring to FIGS. 38A, 38B, 38C, 38D, 38E, 38F, and 38G, with the front cover unit 2410 having the window area 2401a, the buttons 2440, and the keypad 2450 closed, the mobile terminal 100 displays a home mini screen 3810 in the first area of the touch screen 140 corresponding to the window area 2401a. The home mini screen 3810 includes a plurality of application icons 3801, 3802, 3803, 3804, 3805, 3806, 3807, and 3808, a call application icon 3811, and a message application icon 3813.

Upon selection of one of the plurality of application icons 3801, 3802, 3803, 3804, 3805, 3806, 3807, and 3808 on the home mini screen 3810, displayed as illustrated in FIG. 38A, the mobile terminal 100 displays an application mini screen corresponding to an application execution screen of the selected icon. For example, upon selection of the music play application icon 3801 on the home mini screen 3810, the mobile terminal 100 displays a music play application mini screen 3820 corresponding to an execution screen of the music play application, as illustrated in FIG. 38B.

Upon selection of the radio play application icon 3802 on the home mini screen 3810, the mobile terminal 100 displays a radio play application mini screen 3830 corresponding to an execution screen of the radio play application, as illustrated in FIG. 38C.

Upon selection of the voice recorder application icon 3803 on the home mini screen 3810, the mobile terminal 100 may display a voice recorder application mini screen 3840 corresponding to an execution screen of the radio play application, as illustrated in FIG. 38D.

Upon selection of the alarm application icon 3804 on the home mini screen 3810, the mobile terminal 100 displays an alarm application mini screen 3850 corresponding to an execution screen of the alarm application, as illustrated in FIG. 38E.

Upon selection of the calculator application icon 3805 on the home mini screen 3810, the mobile terminal 100 displays a calculator application mini screen 3860 corresponding to an execution screen of the alarm application, as illustrated in FIG. 38F.

Upon selection of the calendar application icon 3806 on the home mini screen 3810, the mobile terminal 100 displays a calendar application mini screen 3870 corresponding to an execution screen of the calendar application, as illustrated in FIG. 38G. In addition to the above-described application mini screens, the mobile terminal 100 may display many other application mini screens.

In various embodiments of the present invention, upon input of text through the keypad 2450 while the front cover unit 2410 is closed, the mobile terminal 100 may immediately execute an application requiring the text input and display a mini screen corresponding to the application.

Figures 39A, 39B:
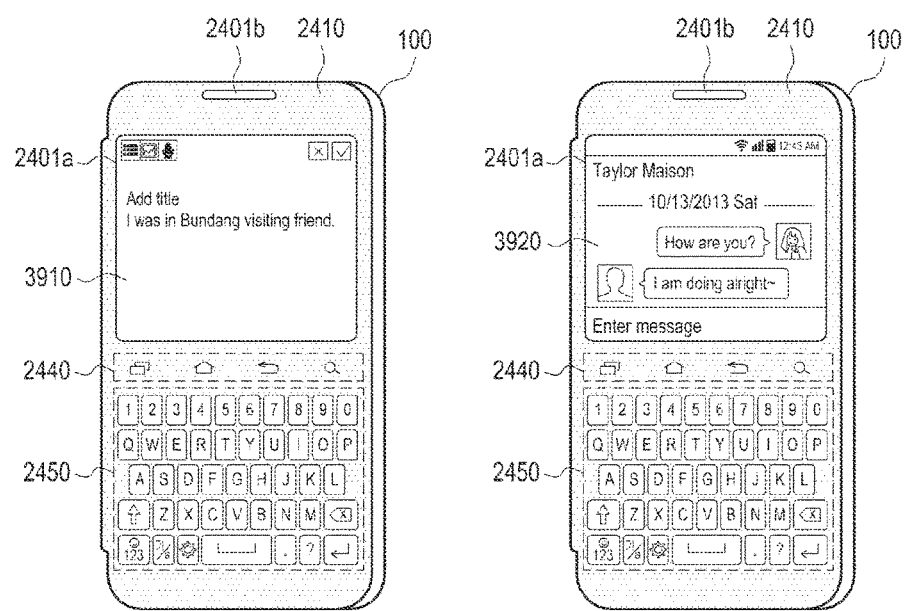
FIGS. 39A and 39B are diagrams illustrating an application requiring a text input, according to an embodiment of the present invention.

FIGS. 39A and 39B are diagrams illustrating applications requiring text input, according to an embodiment of the present invention. Referring to FIGS. 39A and 39B, upon input of text through the keypad 2450 while the front cover unit 2410 is closed, the mobile terminal 100 executes a memo application immediately and display a memo application mini screen 3910, as illustrated in FIG. 39A. Further, upon input of text through the keypad 2450 while the front cover unit 2410 is closed, the mobile terminal 100 executes a message application immediately and displays a message application mini screen 3920, as illustrated in FIG. 39B.

In various embodiments of the present invention, upon execution of an application that does not support a mini screen while the front cover unit 2410 is closed, the mobile terminal 100 may display a message prompting a user to open the front cover unit 2410.

Figures 40A, 40B:
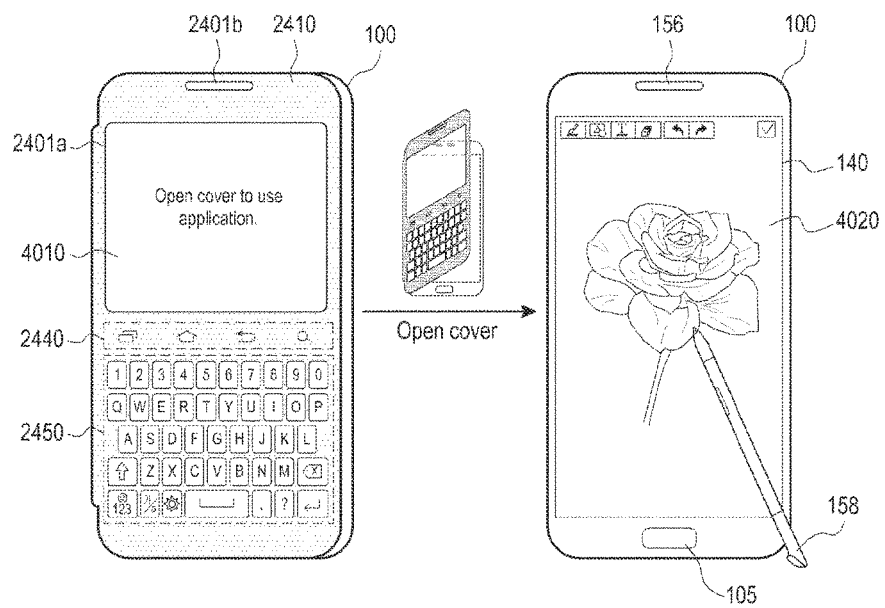
FIGS. 40A and 40B are diagrams illustrating a cover open request message displayed while a front cover unit is closed in a mobile terminal, according to an embodiment of the present invention.

FIGS. 40A and 40B are diagrams illustrating a cover open request message that the mobile terminal 100 displays in the state where the front cover unit is closed, according to an embodiment of the present invention.

Referring to FIGS. 40A and 40B, upon execution of, for example, a note application that does not support a mini screen while the front cover unit 2410 is closed, the mobile terminal 100 displays a message 4010 'Open cover to use application' so that the user may open the front cover unit 2410, as illustrated in FIG. 40A. When the front cover unit 2410 is opened, the mobile terminal 100 displays a full screen 4020 corresponding to the note application, as illustrated in FIG. 40B.

The proposed mobile terminal, user interface method in the mobile terminal, and cover of the mobile terminal may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, in the afore-described various embodiments of the present invention, since at least one window is formed in a part of the cover, even though the cover covers the touch screen of the mobile terminal, information displayed on the touch screen may be viewed through the at least one window, which increases user convenience.

In various embodiments of the present invention, the mobile terminal can identify areas of the touch screen corresponding to at least one window area and a non-window area defined on the cover and may readily control display of information on the area of the touch screen corresponding to the window area of the cover according to an input applied to the non-window area of the cover.

In various embodiments of the present invention, a touch input can be applied to the touch screen through the non-window area of the cover and display of information in a first area of the touch screen corresponding to the window area may be controlled according to the touch input applied through the non-window area of the cover. Therefore, a user may conveniently control information display, in spite of the mobile terminal being covered with the cover.

In various embodiments of the present invention, since text can be input to the touch screen through a keypad formed on the cover, the mobile terminal may control its function according to the text input even though the mobile terminal is covered with the cover.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method of processing input in a mobile terminal, the method comprising:
   identifying a first area of a touch screen of the mobile terminal corresponding to a window area of a cover of the mobile terminal and a second area of the touch screen corresponding to a non-window area of the cover by receiving information from the cover;
   detecting whether the cover of the mobile terminal is closed over the touch screen;
   detecting an input in the touch screen while the cover is closed over the touch screen;
   determining whether the input is a first input in the first area or a second input in the second area;
   processing a first control command according to the first input in the first area and a second control command according to the second input in the second area,
   wherein the first input and the second input are a same gesture type, and
   wherein the first control command and the second control command are different control command.

2. The method of claim 1, further comprising determining a type of the cover, wherein the first area and the second area are defined according to the type of the cover.

3. The method of claim 1, further comprising determining whether an event has occurred, while the cover is closed over the touch screen of the mobile terminal, wherein the first area and the second area are defined according to occurrence of the event.

4. The method of claim 1, further comprising:
   detecting a third input in the first area while the cover is closed over the touch screen;
   processing the third input as a third control command; and
   detecting a fourth input in the second area while the cover is closed over the touch screen; and processing the fourth input as a fourth control command,
   wherein the third input and the fourth input are of a same type, which is different from that of the first input and the second input.

5. The method of claim 1, further comprising receiving cover type information from the cover.

6. The method of claim 5, wherein the cover type information comprises information about at least one of a size and a position of the window area of the cover and information about at least one of a size and a position of the non-window area of the cover.

7. The method of claim 1, further comprising activating a part of the touch screen according to the first and second areas, while the cover is closed over the touch screen.

8. The method of claim 1, further comprising, when the cover is closed over the touch screen, activating a screen of the first area and a touch sensing area of the second area.

9. The method of claim 1, wherein processing the first input comprises displaying information in the first area according to the first input detected in the second area.

10. The method of claim 9, wherein the information comprises at least one of music play information, a camera preview, busy call information, and information about at least one application.

11. A mobile terminal comprising:
   a touch screen; and
   a processor configured to:
   identify a first area of the touch screen corresponding to a window area of a cover of the mobile terminal and a second area of the touch screen corresponding to a non-window area of the cover by receiving information from the cover;
detect whether the cover of the mobile terminal is closed over the touch screen,
detect an input in the touch screen while the cover is closed over the touch screen, determine whether the input is a first input in the first area or a second input in the second area, process a first control command according to the first input in the first area, and a second control command according to the second input in the second area,
wherein the first input and the second input are a same gesture type, and
wherein the first control command and the second control command are different control command.

12. The mobile terminal of claim 11, wherein the non-window area of the cover includes a keypad configured to apply a key input, and the processor is further configured to detect the key input applied through the keypad of the non-window area of the cover in the second area.

13. The mobile terminal of claim 12, wherein the processor is further configured to receive a text input as a result of detecting the key input through the keypad and control execution of a function according to the text input.

14. The mobile terminal of claim 11, further comprising a receiver configured to receive cover type information from the cover,
wherein the processor is further configured to check the cover type information about the cover and define the first and second areas according to the cover type information.

15. The mobile terminal of claim 14, further comprising a memory configured to store the cover type information.

16. The mobile terminal of claim 14, wherein the cover type information comprises information about at least one of a size and a position of the window area of the cover and information about at least one of a size and a position of the non-window area of the cover.

17. The mobile terminal of claim 11, wherein the window area of the cover is transparent or semi-transparent and the non-window area of the cover is opaque.

18. The mobile terminal of claim 11, wherein the processor is further configured to set different touch input sensitivities for sensing touch inputs in the first area and the second area of the touch screen.

19. The mobile terminal of claim 11, wherein the processor is further configured to set touch input sensitivities for sensing touch inputs in the first area and the second area of the touch screen according to whether the cover is closed over the touch screen.

20. The mobile terminal of claim 11, further comprising a battery packet disposed inside a rear surface of the mobile terminal,
wherein the touch screen is formed on a front surface of the mobile terminal, and
wherein the cover comprises:
a battery cover unit provided on the rear surface of the mobile terminal, for protecting the battery packet; and
a front cover unit connected to the battery cover unit, for covering the touch screen of the mobile terminal.

21. The mobile terminal of claim 11, wherein the cover comprises:
a front cover unit configured to cover a front surface of the mobile terminal;
a rear cover unit configured to cover a rear surface of the mobile terminal; and
a connection unit configured to connect the front cover unit to the rear cover unit.

22. The mobile terminal of claim 11, further comprising a magnetic force sensor configured to sense a change of an external magnetic force,
wherein the processor is further configured to control the touch screen according to the change of the external magnetic force sensed by the magnetic force sensor.

23. A mobile terminal comprising:
a cover including a transparent or semi-transparent window area and an opaque non-window area, which includes a keypad configured to apply a plurality of distinctive key inputs to the mobile terminal, for covering a touch screen of the mobile terminal;
the touch screen including a first area corresponding to the window area of the cover and a second area corresponding to the non-window area of the cover, wherein the keypad includes a plurality of distinctive keys that are engraved into or printed on an outer surface of a front cover unit of the cover; and
a processor configured to:
identify the first area of the touch screen corresponding to the window area of the cover of the mobile terminal and the second area of the touch screen corresponding to the non-window area of the cover by receiving information from the cover;
control the touch screen to display a visual object on a first area of the touch screen corresponding to a window area of a cover of the mobile terminal, wherein one of the visual object and another visual object are not displayed on a second area of the touch screen corresponding to a non-window area of the cover while the cover is closed over the touch screen,
activate touch sensing for the second area of the touch screen while the cover is closed over the touch screen,
control display of information in the first area of the touch screen according to an input to the second area of the touch screen, while the cover is closed over the touch screen.

24. The mobile terminal of claim 23, wherein the processor is further configured to receive cover type information from the cover.

25. The mobile terminal of claim 24, wherein the processor is further configured to check the cover type information and determine the first area and the second area of the touch screen according to the cover type information.

26. The mobile terminal of claim 24, wherein the cover type information comprises information about at least one of a size and a position of the window area of the cover and information about at least one of a size and a position of the non-window area of the cover.

27. A cover for a mobile terminal, comprising:
a front cover unit configured to cover a touch screen formed on a front surface of the mobile terminal; and
a rear cover unit configured to cover a rear surface of the mobile terminal,
wherein the front cover unit includes a transparent or semi-transparent window area and an opaque non-window area,
a cover type information provider configured to provide cover type information to the mobile terminal, wherein the cover type information comprises information about at least one of a size and a position of the window area of the cover and information about at least one of a size and a position of the non-window area of the cover, and wherein the non-window area of the front cover unit includes an input area, which includes a keypad configured to apply a plurality of distinctive key inputs to the mobile terminal, and while the front cover unit covers the touch screen of the mobile terminal, an input is applied to the touch screen through the input area of the non-window area, wherein the keypad includes a plurality of distinctive keys that are engraved into or printed on an outer surface of the front cover unit.

28. The cover of claim 27, wherein the front cover unit comprises a magnetic force applier configured to generate a magnetic force.

29. The cover of claim 27, wherein the input applied through the non-window area is applied in a part of the non-window area visually distinguished from another part of the non-window area.

30. The cover of claim 27, wherein at least a part of the non-window area is formed of at least one of conductive silicon, an anti-static electric material, and silver nylon.

31. An article of manufacture for processing input in a mobile terminal, comprising a non-transitory machine readable medium containing one or more programs which when executed implement the steps of:

identify a first area of a touch screen corresponding to a window area of a cover of the mobile terminal and a second area of the touch screen corresponding to a non-window area of the cover by receiving information from the cover;

detecting whether the cover of the mobile terminal is closed over the touch screen;

activating touch sensing for the second area of the touch screen while the cover is closed over the touch screen;

detecting an input in the touch screen while the cover is closed over the touch screen;

determining whether the input is a first input in the first area or a second input in the second area;

processing a first control command according to the first input in the first area and a second control command according to the second input in the second area, wherein the first input and the second input are of a same gesture type, and wherein the first control command and the second control command are different control command.

* * * * *